United States Patent
Kato et al.

(10) Patent No.: US 8,332,764 B2
(45) Date of Patent: Dec. 11, 2012

(54) EDITING DEVICE, INFORMATION PROCESSING DEVICE, EDITING METHOD, AND EDITING PROGRAM PRODUCT

(75) Inventors: Kazuko Kato, Yamato (JP); Yousuke Kubo, Yokohama (JP); Kunihiro Shimura, Machida (JP); Nobuhiro Sugimasa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 12/096,193

(22) PCT Filed: Dec. 5, 2006

(86) PCT No.: PCT/JP2006/324239
§ 371 (c)(1),
(2), (4) Date: Jun. 5, 2008

(87) PCT Pub. No.: WO2007/066648
PCT Pub. Date: Jun. 14, 2007

(65) Prior Publication Data
US 2009/0129739 A1    May 21, 2009

(30) Foreign Application Priority Data

Dec. 5, 2005 (JP) .................................. 2005-350944

(51) Int. Cl.
*G06F 3/048* (2006.01)
(52) U.S. Cl. ......... 715/763; 715/762; 715/781; 715/783
(58) Field of Classification Search .................. 715/781, 715/783, 763, 762
See application file for complete search history.

(56) References Cited

U.S. PATENT DOCUMENTS 5,786,816 A * 7/1998 Macrae et al. ................ 715/837
(Continued)

FOREIGN PATENT DOCUMENTS

JP          4294424          10/1992
(Continued)

OTHER PUBLICATIONS

"Drawrial", Communication and Technology Systems, http://www.zipc.com/.
(Continued)

*Primary Examiner* — Andrey Belousov
(74) *Attorney, Agent, or Firm* — Winstead, P.C.

(57) ABSTRACT

Effort during screen transition editing is reduced. An editing device for editing transitions each between a plurality of display screens, comprising: a transition display unit which displays a transition diagram window for entering the transition; a screen layout unit which places screen nodes representing specified display screens in the transition diagram window; a transition layout unit which places a specified transition from a display screen before the transition to a display screen after the transition into the transition diagram window as a link from the screen node representing the display screen before the transition to the screen node representing the display screen after the transition; a transition condition input unit which allows a user to enter a transition condition for performing the transition represented by the link; a transition condition storage unit which stores the transition condition for performing the transition represented by the link, associating the transition condition with the link; and a generation unit which generates a transition rule for performing the transition between the plurality of display screens displayed by a display device on the basis of the link and the transition condition stored in the transition condition storage unit.

15 Claims, 20 Drawing Sheets

U.S. PATENT DOCUMENTS 6,055,369 A * 4/2000 Sawahata et al. ............ 717/109

FOREIGN PATENT DOCUMENTS

| | | |
|---|---|---|
| JP | 6282426 | 10/1994 |
| JP | 7219754 | 8/1995 |
| JP | 9062469 | 3/1997 |
| JP | 10307716 | 11/1998 |
| JP | 11-161401 | 6/1999 |
| JP | 2001306310 | 11/2001 |
| JP | 06-168203 | 6/2002 |
| JP | 2002-183914 | 6/2002 |
| JP | 2004302904 | 10/2004 |

OTHER PUBLICATIONS

"Drawrial", Communication and Technology Systems, http://www.zipc.com/ Abstract.

* cited by examiner

| 151 | 152 | 153 | 154 | 155 | 156 | 157 | 158 | 159 | 160 |
|---|---|---|---|---|---|---|---|---|---|
| CURRENT SCREEN ID | EVENT ID | NEXT SCREEN ID | ACTION ID | NEXT DOMAIN | INTERRUPT | NUMBER OF CONDITIONS | CONDITION 1 | CONDITION 2 | CONDITION 3 |
| 1 | 100 | 2 | 501 | -1 | 0 | 1 | 1 | | |
| 1 | 100 | 3 | 506 | -1 | 0 | 1 | 0 | | |
| 2 | 100 | 3 | 507 | -1 | 0 | 0 | 0 | | |
| 3 | 101 | 4 | 508 | -1 | 0 | 0 | 0 | | |
| 3 | 107 | 7 | 509 | -1 | 0 | 0 | 0 | | |
| 4 | 102 | 3 | 510 | -1 | 0 | 1 | 0 | | |
| 4 | 103 | 3 | 511 | -1 | 0 | 1 | 1 | | |
| 4 | 103 | 5 | 512 | -1 | 0 | 0 | 0 | | |
| 4 | 104 | 5 | 513 | -1 | 0 | 0 | 0 | | |
| ----- | ----- | ----- | ----- | ----- | ----- | ----- | ----- | ----- | ----- |
| -1 | 108 | 8 | 556 | 2 | 1 | 0 | 0 | 0 | 0 |

↑ ID INDICATING ALL SCREENS IN DOMAIN

FIG. 16

```
 10 SetCondition(condition_a)  ; DISPLAY A
    ....
 20 SetCondition(condition_b)  ; DISPLAY B
    ....
 30 SetCondition(condition_c)  ; DISPLAY C
    ....
 40 PreUserProcess(panel) {
 50 switch (panel):
 60   case Panel_A:  preProcessA() ; PREPROCESSING OF A
 70   case Panel_B:  preProcessB() ; PREPROCESSING OF B
 80   case Panel_C:  preProcessC() ; PREPROCESSING OF C
    ....
 90 }
    ....
100 PostUserProcess(panel) {
110 switch (panel):
120   case Panel_A:  postProcessA() ; POSTPROCESSING OF A
130   case Panel_B:  postProcessB() ; POSTPROCESSING OF B
140   case Panel_C:  postProcessC() ; POSTPROCESSING OF C
    ....
150 }
    ....
```

FIG. 20

EDITING DEVICE, INFORMATION PROCESSING DEVICE, EDITING METHOD, AND EDITING PROGRAM PRODUCT

TECHNICAL FIELD

The present invention relates to an editing device, an information processing device, an editing method, and an editing program. Particularly, the present invention relates to an editing device, an information processing device, an editing method, and an editing program for editing transitions each between a plurality of display screens displayed by a display device.

BACKGROUND ART

An information processing device such as a car navigation system, a digital consumer electronics device, or a personal digital assistant displays a large number of display screens as a user interface. These display screens change according to various events that occur in the information processing device. The information processing device controls the transitions of the plurality of display screens on the basis of a program.

There have been suggested methods of controlling the transitions of display screens in the information processing device, for example, in Patent Documents 1 to 3. Patent Document 1 discloses an information processing device which includes a screen transition unit which effects a transition to a screen having a corresponding screen name with reference to a screen transition table based on a screen number. Patent Document 2 discloses a screen transition display device having a GUI for displaying a screen transition state in a tree structure on a screen. Patent Document 3 discloses a screen transition centralized control system with a screen transition table for use in managing a screen transition system in an integrated fashion.

Patent Document 1: Japanese Unexamined Patent Publication (Kokai) No. Hei 11-161401
Patent Document 2: Japanese Unexamined Patent Publication (Kokai) No. 2002-183914
Patent Document 3: Japanese Unexamined Patent Publication (Kokai) No. Hei 6-168203

DISCLOSURE OF THE INVENTION

Problems to be Solved by the Invention

In recent years, information processing devices such as digital consumer electronics devices have become more complicated in a transition structure of a display screen along with an increase in performance. Therefore, an editing device has been getting incapable of simply displaying the transition structure of a target information processing device. As a result, it becomes difficult for the editing device to allow a user to recognize the transition structure visually and intuitively, which increases the user's effort during transition editing.

Therefore, it is an object of the present invention to provide an editing device, an information processing device, an editing method, and an editing program capable of solving the above problem. This object is achieved by the combination of features of the independent claims in the appended claims. The dependent claims define further advantageous embodiments of the present invention.

Means for Solving the Problems

According to the present invention, there are provided an editing device for editing transitions each between a plurality of display screens, comprising: a transition display unit which displays a transition diagram window for allowing a user to enter the transition between the plurality of display screens; a screen layout unit which places screen nodes representing the display screens specified by the user in the transition diagram window; a transition layout unit which places a transition from the display screen before the transition to the display screen after the transition specified by the user into the transition diagram window as a link from the screen node representing the display screen before the transition to the screen node representing the display screen after the transition; a transition condition input unit which allows the user to enter a transition condition for performing the transition represented by the link; a transition condition storage unit which stores the transition condition for performing the transition represented by the link, associating the transition condition with the link; and a generation unit which generates a transition rule for performing the transition between the plurality of display screens displayed by the display device on the basis of the link and the transition condition stored in the transition condition storage unit, an editing method using the editing device, and an editing program which causes a computer to function as the editing device.

Moreover, according to the present invention, there is provided an information processing device for executing an application program which performs information processing specified by a user, comprising: a display unit which displays a display screen based on the information processing performed by the application program out of a plurality of display screens; a memory unit which stores a transition rule that defines a transition condition for performing a transition of a screen to be displayed from the display screen of a transition source displayed by the display unit to the display screen of a transition destination; an acquisition unit which reads the currently displayed display screen and the transition condition based on a user's operation for the currently displayed display screen from the memory unit and acquires the display screen of the transition destination; and a change unit which changes the display screen displayed by the display unit to the display screen of the transition destination acquired by the acquisition unit.

The above summary of the invention does not necessarily describe all necessary features of the invention and the invention may also be a sub-combination of these described features.

Advantages of the Invention

According to the present invention, it is possible to visually and intuitively recognize a complicated transition structure between display screens, thereby reducing effort during screen transition editing.

BEST MODE FOR CARRYING OUT THE INVENTION

Although the present invention will be described hereinafter by way of embodiments, the following embodiments do not limit the invention according to claims and all combinations of the features described in the embodiments are not necessarily essential to means for solving the problems of the invention.

FIG. 1 shows an editing device 10 and an information processing device 30 according to this embodiment. The editing device 10 generates display screens displayed by the information processing device 30 and edits transitions each between the plurality of display screens. Moreover, the editing device 10 includes a test information processing device 20 for allowing a user to test the transitions each between the plurality of display screens. The information processing device 30, which is an information processing device having, for example, a display panel for use in displaying the display screens generated by the editing device 10, executes an application program for performing information processing designated by a user.

FIG. 2 shows a configuration of the editing device 10. The editing device 10 includes a screen editor 11, a screen definition data memory unit 12, a transition editor 13, a transition table memory unit 14, an execution model editor 15, an execution model code memory unit 16, a code output unit 17, and a test information processing device 20. The screen editor 11 generates each display screen according to a user's instruction. The screen definition data memory unit 12 stores data on the plurality of display screens generated by the screen editor 11, for example, in an Extensible Markup Language (XML) format.

The transition editor 13 edits transitions of each display screen according to a user's instruction and generates a transition rule for allowing transitions each between the plurality of display screens displayed by the information processing device 30. The transition table memory unit 14 stores a transition table described, for example, in the ECA (event, condition, action) table format in which the transition rule generated by the transition editor 13 is stored. The execution model editor 15 defines variables exchanged between an application program, which is executed on the information processing device 30 to perform information processing designated by a user using a plurality of display screens, and a display program. The execution model code memory unit 16 stores the variables defined by the execution model editor 15 as execution model codes.

The code output unit 17 outputs a test code, which includes the display program to be executed on the test information processing device 20 and the transition rule, and an actually used code, which is used in actual use and includes the display program to be executed on the information processing device 30 and the transition rule, on the basis of the display screen data stored in the screen definition data memory unit 12, the transition table stored in the transition table memory unit 14, and the actual model code stored in the execution model code memory unit 16. The test information processing device 20 tests the transitions of the display screens by executing the test code. The actually used code whose operation has been verified with a test performed by the test information processing device 20 is incorporated into the information processing device 30 having the display device to cause the information processing device 30 to display a display screen.

FIG. 3 shows a configuration of the transition editor 13 included in the editing device 10. The transition editor 13 includes a transition display unit 40, a screen input unit 41, a screen storage unit 42, a screen layout unit 43, a transition input unit 44, a transition storage unit 45, a transition layout unit 46, a jump node input unit 47, a jump node storage unit 48, a jump node layout unit 49, an interrupt node input unit 50, an interrupt node storage unit 51, an interrupt node layout unit 52, a function node input unit 53, a function node storage unit 54, a function node layout unit 55, a copy unit 56, a transition condition input unit 61, a transition condition storage unit 62, a prerequisite input unit 63, a prerequisite storage unit 64, an interrupt condition input unit 65, an interrupt condition storage unit 66, a function input unit 67, a function storage unit 68, and a generation unit 69. According to the transition editor 13, it is possible to simply display an even complicated transition structure of display screens so as to facilitate the editing work.

The transition display unit 40 displays a transition diagram window for allowing a user to enter transitions each between the plurality of display screens. The screen input unit 41 enters a screen node which represents a display screen according to a user's instruction. The screen input unit 41 enters the screen node, for example, by allowing the user to select one of the plurality of display screens stored in the screen definition data memory unit 12. The screen storage unit 42 stores the screen node entered by the screen input unit 41. The screen layout unit 43 reads the screen node specified by the user from the screen storage unit 42 and places the screen node in a position specified by the user in the transition diagram window. The screen layout unit 43 places the screen node into the transition diagram window.

The transition input unit 44 enters a link which represents a transition from a display screen before the transition to a display screen after the transition according to a user's instruction. The transition storage unit 45 stores the link entered by the transition input unit 44. The transition layout unit 46 places the transition specified by the user in the transition diagram window, as a link from a screen node which represents the display screen before the transition to a screen node which represents the display screen after the transition. The jump node input unit 47 enters a jump node according to a user's instruction. The jump node storage unit 48 stores the jump node entered by the jump node input unit 47. The jump node layout unit 49 places the jump node specified by the user in the transition diagram window.

The interrupt node input unit 50 enters an interrupt node according to a user's instruction. The interrupt node storage unit 51 stores the interrupt node entered by the interrupt node input unit 50. The interrupt node layout unit 52 places the interrupt node specified by the user in the transition diagram window. The function node input unit 53 enters a function node according to a user's instruction. The function node storage unit 54 stores the function node entered by the function node input unit 53. The function node layout unit 55 places the function node in the transition diagram window according to a user's instruction. The copy unit 56 generates a transition diagram window of a copy destination in response to a user's input of an instruction for producing a copy of the transition diagram window and places a screen node, which represents the same display screen as the screen node of a copy source, into the transition diagram window of the copy destination.

The transition condition input unit 61 accepts a user's input of the transition condition for performing the transition represented by the link. The transition condition storage unit 62 stores the transition condition, associating the transition condition with each link entered by the user. The prerequisite input unit 63 accepts a user's input of prerequisites for the transitions contained in a plurality of transition diagram windows with the prerequisites associated with the respective transition diagram windows. The prerequisite storage unit 64 stores the prerequisites associated with the transition diagram windows where links are placed with the prerequisites associated with the respective links entered by the user. The interrupt condition input unit 65 enters an interrupt condition according to a user's specification. The interrupt condition storage unit 66 stores the interrupt conditions with the interrupt conditions associated with the respective interrupt nodes entered by the user. The function input unit 67 enters a function represented by the function node according to a user's specification. The function storage unit 68 stores the functions with the functions associated with the respective function nodes entered by the user.

The generation unit 69 generates a transition rule which should be supplied to the display program executed on the information processing device 30 in order to take place transitions each between the plurality of display screens displayed by the information processing device 30 on the basis of the links stored in the transition storage unit 45, the transition conditions stored in the transition condition storage unit 62, the prerequisites stored in the prerequisite storage unit 64, the interrupt conditions stored in the interrupt condition storage unit 66, and the functions stored in the function storage unit 68. The generation unit 69 stores the generated transition rule into the transition table memory unit 14. Moreover, the generation unit 69 may manage the transition rules of all display screens of the information processing device 30 by generating a transition table where the transition rule of one link is stored in one record. In this instance, the generation unit 69 stores the generated transition table in a file format into the transition table memory unit 14.

FIG. 4 shows a flowchart illustrating the processing of the editing device 10. First, in the case of receiving an instruction from the user, the editing device 10 determines whether the instruction is for a normal transition input process (S11), for a copy process (S12), for domain decomposition (S13), for a layer decomposition (S14), for an interrupt node layout (S15), or for a function node layout (S16).

If the instruction from the user is for the normal process (S11: Yes), the editing device 10 performs the normal transition input process (S21). If the instruction from the user is for the copy process (S12: Yes), the editing device 10 performs the copy process (S22). If the instruction from the user is for the domain decomposition (S13: Yes), the editing device 10 performs the domain decomposition process (S23). If the instruction from the user is for the layer decomposition (S14: Yes), the editing device 10 performs the layer decomposition process (S24). If the instruction from the user is for the interrupt node layout (S15: Yes), the editing device 10 performs the interrupt node layout process (S25). If the instruction from the user is for the function node layout (S16: Yes), the editing device 10 performs the function node layout process (S26). Thereafter, the editing device 10 enters a standby state until receiving an instruction from the user again upon a completion of one of the processes in steps S21 to S26.

FIG. 5 shows a transition diagram window 100 as an example for describing the normal transition input process in step S21 of FIG. 4. The editing device 10 displays the transition diagram window 100 in the normal transition input process in step S21 and performs a process of placing screen nodes 101 and links 102 in the transition diagram window 100. The transition diagram window 100 is a work frame for editing the transitions of the display screens. The transition display unit 40 displays a plurality of transition diagram windows 100 while appropriately switching the transition diagram windows 100 according to a user's instruction.

The screen node 101 represents a display screen to be a transition target. The screen input unit 41 enters the screen node 101 of the display screen specified by the user. The screen layout unit 43 places the screen node 101 in a position specified by the user in the transition diagram window 100. The screen layout unit 43 displays the screen node 101, for example, as a thumbnail image in the transition diagram window 100. The screen node 101 may include an identifier (ID) of the corresponding display screen, a file stored area of the corresponding display screen or the like as information.

The link 102 represents a transition from a display screen before the transition to a display screen after the transition.

The transition input unit 44 enters the link 102 from a display screen selected first to a display screen selected next by a user's continuous selection of two screen nodes 101 placed in the transition diagram window 100. The transition layout unit 46 places the entered link 102 in the transition diagram window 100. The transition layout unit 46 displays the link 102, for example, as an arrow connecting the corresponding screen nodes 101 to each other. If a new screen node 101 with a link 102 already formed is placed in the transition diagram window 100, the transition layout unit 46 may read the corresponding link 102 from the transition storage unit 45 and place the corresponding link 102 in the transition diagram window 100. The link 102 may include an identifier of the display screen before the transition and the identifier of the display screen after the transition as information.

Moreover, the editing device 10 accepts an input of the transition condition accompanying the link 102. The transition condition is a condition under which the transition between the display screens occurs. For example, if the screen changes to another screen, for example, when a button click event occurs, the button click event is the transition condition. The transition condition input unit 61 enters this transition condition according to a user's instruction every time a new link 102 is entered. The transition condition input unit 61 enters, for example, an identifier indicating the transition condition (for example, an event ID) according to a user's instruction. The transition condition storage unit 62 stores the entered transition conditions, associating the transition conditions with the links 102 entered by the user, respectively.

FIG. 6 shows a flowchart of a procedure for a normal transition input process in step S21 of FIG. 4. The editing device 10 performs the processing in this drawing as the process in step S21 of FIG. 4. First, the transition display unit 40 displays the transition diagram window 100 specified by the user (S31). Subsequently, the screen layout unit 43 places the screen nodes 101 entered according to the user's specification (S32). Then, the transition layout unit 46 places the links 102 entered according to the user's specification (S33).

Subsequently, the transition condition input unit 61 enters the transition condition according to the user's specification (S34). Then, the transition condition storage unit 62 stores the entered transition condition (S35). Subsequently, the generation unit 69 generates a transition rule to be supplied to the display program executed on the information processing device 30 in order to take place transitions each between a plurality of display screens displayed by the information processing device 30 on the basis of the transition conditions and the links 102 (S36).

As described hereinabove, the editing device 10 is capable of editing the transitions while displaying the transition diagram window 100 where the screen nodes 101 and the links 102 are placed, thereby allowing the user to visually and intuitively recognize the transition structure of the display screens of the information processing device 30.

FIG. 7 shows the transition diagram window 100 as an example for describing the copy process in step S22 of FIG. 4. The copy unit 56 of the editing device 10 copies an already generated transition diagram window 100 in the copy process in step S22 to generate a new transition diagram window 100. This allows the editing device 10 to easily generate the new transition diagram window 100 which is the same as the already generated transition diagram window 100. Moreover, the copy unit 56 copies the screen nodes 101 and the links 102 placed in the transition diagram window 100 along with the transition diagram window 100 in the copy process. Alternatively, the copy unit 56 may produce a copy not including the links 102. This allows the transitions whose sources or destinations are the same screen nodes 101 to be organized before input to the plurality of transition diagram windows 100.

FIG. 8 shows the transition diagram window 100 as an example for describing the domain decomposition process in step S23 of FIG. 4. The editing device 10 places the plurality of screen nodes 101 which represent display screens in the plurality of transition diagram windows 100 in the domain decomposition process in step S23. This allows the editing device 10 to display the transition structure of a large number of display screens with being divided into a plurality of transition diagram windows (domains) 100. The plurality of divided transition diagrams may be displayed at a time or may be displayed one by one each time.

The editing device 10 may place one or more of the plurality of screen nodes 101 placed in each of the plurality of transition diagram windows 100, as a jump node 103 or jump nodes 103. The jump node 103 represents, at least in one transition diagram window 100, a transition from a screen node 101 in the transition diagram window 100 to a screen node 101 in another transition diagram window 100. The jump node 103 may include, for example, an identifier of the corresponding display screen or an identifier of the corresponding screen node as information.

The jump node layout unit 49 places the jump node 103 in a position specified by the user in the transition diagram window 100. The jump node layout unit 49 displays the jump node 103, for example, as an icon having a predetermined shape. Moreover, the jump node 103 is connected to another screen node 101 in the transition diagram window 100 and a link 102. The editing device 10 places the jump node 103 in the transition diagram window 100, thereby enabling the transition diagram window 100 to be divided in an appropriate position and allowing the user to recognize the transition from the jump node 103 to the screen node 101 placed on another transition diagram window 100.

FIG. 9 shows a flowchart of a procedure for the domain decomposition process in step S23 of FIG. 4. The editing device 10 performs the processing in this drawing as the process in step S23 of FIG. 4. First, the transition display unit 40 displays a plurality of transition diagram windows 100 specified by the user (S41). Subsequently, the screen layout unit 43 places a plurality of screen nodes 101 which represent the display screens in the plurality of transition diagram windows 100, respectively, according to a user's instruction (S42). In this instance, the jump node layout unit 49 may place a jump node 103 in the transition diagram window 100, instead of one or more of the screen nodes 101 (S42). The transition layout unit 46 places links 102 which represent transitions different from each other each having a screen node 101 representing a display screen or a jump node 103 as a transition source or a transition destination on each transition diagram window 100 according to a user's instruction. The screen layout unit 43 may place the plurality of screen nodes 101 which represent the same display screens and the jump node 103 in each of the plurality of transition diagram windows 100 in step S42. In response to this, the transition layout unit 46 may place links 102 which represent transitions different from each other having the screen nodes 101 representing the same display screens and the jump node 103 as transition sources or transition destinations in the plurality of transition diagram windows 100.

Subsequently, the generation unit 69 generates a transition rule covering a transition whose transition source or transition destination is a display screen on the basis of a plurality of links 102 whose transition sources or transition destinations are a plurality of screen nodes 101 which represent display screens and jump nodes 103 placed in the plurality of transition diagram windows 100 and the plurality of transition conditions of the plurality of links 102. As described hereinabove, the editing device 10 places the plurality of screen nodes 101 which represent display screens and jump nodes 103 onto the plurality of transition diagram windows 100, thereby enabling a simple display of a complicated transition structure of display screens.

FIG. 10 shows the transition diagram window 100 as an example for describing the layer decomposition process in step S24 of FIG. 4. The editing device 10 accepts a user's input of the prerequisites associated with the respective transition diagram windows 100 in the layer decomposition process in step S24.

The prerequisite is for a transition represented by a link 102 located in each transition diagram window 100. While a displayed screen depends on whether a vehicle is in an operating state or a non-operating state in some cases at the time of an incoming call in a car navigation system, it is possible to set the vehicle operating state or non-operating state in this situation as a prerequisite by way of example. The prerequisite input unit 63 enters this type of prerequisites according to a user's specification and associates the prerequisites with the respective links 102 in the transition diagram window 100. The editing device 10 is capable of entering the prerequisite for each of the transition diagram windows 100 in this manner, thereby enabling an input of the transition condition by using the plurality of transition diagram windows 100 divided according to the prerequisite. While FIG. 10 shows that there are located the screen nodes 101 corresponding to two transition diagram windows 100, respectively, whose prerequisites are different from each other, there may be screen nodes 101 located only in one of the transition diagram windows 100. Moreover, like screen nodes 101 denoted by D and E, the editing device 10 may place new screen nodes 101 and links 102 for each of the transition diagram windows 100 divided according to the prerequisite.

FIG. 11 shows a flowchart of a procedure for the layer decomposition process in step S24 of FIG. 4. The editing device 10 performs the processing in this drawing as the process in step S24 of FIG. 4. First, the transition display unit 40 displays the transition diagram window 100 specified by the user and enters the prerequisite of the transition diagram window 100 (S51). Subsequently, the screen layout unit 43 places screen nodes 101 entered according to a user's specification (S52). Then, the transition layout unit 46 places links 102 entered according to a user's specification (S53).

Subsequently, the transition condition input unit 61 enters a transition condition according to a user's specification (S54). Then, the transition storage unit 45 stores the prerequisite, which is associated with the transition diagram window 100 where the links 102 are placed, in such a way as to be included in the transition condition of the link 102, associating the prerequisite with each of the links 102 (S55). Thereafter, the generation unit 69 generates the transition rule to be supplied to the display program, which is executed on the information processing device 30, on the basis of the transition conditions and the links 102 (S56). Then, the screen layout unit 43 returns the processing to step S52 in the case where a screen node 101 is entered again.

Thereby, the editing device 10 automatically sets the prerequisite from the next processing, thereby enabling a generation of the transition rule while partially omitting an input of the transition conditions of the links 102. Moreover, it is possible to divide and display the transition diagram window 100 for each prerequisite, thereby enabling a simple display of a complicated transition structure of display screens.

FIG. 12 shows a transition diagram window 100 as an example for describing the interrupt node layout process in step S25 of FIG. 4. The editing device 10 places interrupt nodes 104 in the transition diagram window 100 according to a user's instruction in the interrupt node layout process in step S25.

The interrupt node 104 is connected to a screen node 101 representing an interrupt display screen of the transition destination in response to an occurrence of an interrupt during display of a plurality of display screens. The interrupt node layout unit 52 places the interrupt node 104 in the position specified by the user in the transition diagram window 100, for example, in response to a user's specific operation. The interrupt node 104 may include, for example, identifiers of a plurality of display screens before the interrupt and identifiers of display screens to which the display screens should change after the interrupt as information. The interrupt node layout unit 52 displays the interrupt node 104, for example, as an icon having a predetermined shape.

Since the interrupt node layout unit 52 places the interrupt node 104 in the case of a transition from a plurality of display screens to one display screen, the interrupt node layout unit 52 places the interrupt node 104 with the screen node 101 of the transition destination and the link 102 connected thereto in the transition diagram window 100 where the screen node 101 of the transition destination is located. The interrupt node layout unit 52 does not need to connect the screen node 101 of the transition source with the interrupt node 104 via a link 102.

The interrupt condition input unit 65 recognizes an interrupt condition by a user's input of a specification of the display screen of the interrupt source, from which the transition caused by an interrupt represented by the interrupt node 104 should be performed. The specification of the interrupt condition identifies the display screen of the interrupt source for the interrupt represented by the interrupt node 104. The interrupt destination is specified by the link 102 connected to the interrupt node 104. Alternatively, the interrupt destination may be specified by the interrupt condition. If an interrupt (for example, an interrupt event such as an incoming call) occurs, for example, even during display of one of the display screens in the transition diagram window 100, the interrupt condition input unit 65 may enter an identifier indicating the transition diagram window 100 as an interrupt condition.

FIG. 13 shows a flowchart of a procedure for the interrupt node layout process in step S25 of FIG. 4. The editing device 10 performs the processing in this drawing as the process in step S25 of FIG. 4. First, the transition display unit 40 displays a transition diagram window 100 in which the screen node 101 of the interrupt destination is located (S61). Subsequently, the interrupt node layout unit 52 places the entered interrupt node 104 in the transition diagram window 100, in which the screen node 101 of the interrupt destination is located, according to a user's specification (S62).

Subsequently, the interrupt condition input unit 65 enters an interrupt condition according to a user's specification (S63). Thereafter, the interrupt condition storage unit 66 stores the interrupt condition entered by the interrupt condition input unit 65, associating the interrupt condition with the interrupt node 104 (S64). Subsequently, the generation unit 69 generates a transition rule covering a transition for displaying the display screen of the interrupt destination in response to an occurrence of an interrupt during display of the display screen, which satisfies the interrupt condition, placed in the plurality of transition diagram windows 100 (S65).

According to the editing device 10 as described above, the interrupt node 104 is placed in the transition diagram windows 100, thereby enabling a transition to a display screen to be an interrupt destination in the case of an occurrence of an event (interrupt) during display of one of the plurality of display screens on the information processing device 30. The editing device 10 is capable of displaying display screens, which have been displayed due to an occurrence of an interrupt, with the display screens separated from other transition diagram windows 100, thereby enabling a simple display of a complicated transition structure.

FIG. 14 shows a transition diagram window 100 as an example for describing the function node layout process in step S26 of FIG. 4. The editing device 10 places a function node 105 in the transition diagram window 100 according to a user's specification in the function node layout process in step S26.

The function node 105 defines a transition relation between one or more display screens before the transition and one or more display screens after the transition using a function. The function node layout unit 55 is placed in each transition diagram window 100, which contains the screen nodes 101 corresponding to the display screens whose transition relation is defined by the function. The function node layout unit 55 connects the function node 105 to a screen node 101 via a link 102. Moreover, the function node layout unit 55 displays the function node 105, for example, as an icon having a predetermined shape.

FIG. 15 shows a flowchart of a procedure for the function node layout process in step S26 of FIG. 4. The editing device 10 performs the processing in this drawing as the process in step S26 of FIG. 4. First, the transition display unit 40 displays a transition diagram window 100 where the screen nodes 101 connected to the function node 105 are placed (S71). Subsequently, the function node layout unit 55 places the entered function node 105 in the transition diagram window 100 according to a user's specification and connects the function node 105 to the screen nodes 101 whose transition relation is defined by the function node 105 via links 102 (S72).

Subsequently, the function input unit 67 enters the function defined by the function node 105 according to a user's specification (S73). Then, the function storage unit 68 stores the function entered by the function input unit 67, associating the function with the function node 105 (S74). Thereafter, the generation unit 69 generates a transition rule covering a transition satisfying the function associated with the function node 105 placed in each transition diagram window 100 (S75). According to the editing device 10 as described above, it is possible to reduce the number of, for example, links 102 by placing the function node 105 in the transition diagram window 100, thereby enabling a simple display of a complicated transition structure of display screens.

FIG. 16 shows an example of a transition table. The generation unit 69 generates the transition table storing the transition rule and stores the transition table into the transition table memory unit 14. The transition table has a plurality of records. Each record corresponds to, for example, one transition and stores a transition rule on the corresponding transition.

Each record included in the transition table has, for example, a current screen ID field 151, an event ID field 152, a next screen ID field 153, an action ID field 154, a next domain field 155, an interrupt field 156, a condition number field 157, a condition 1 field 158, a condition 2 field 159, and a condition 3 field 160.

The current screen ID field 151 stores an identifier of a display screen of a transition source. The current screen ID field 151 may store an identifier (ID) indicating all display screens placed in the transition diagram window 100. The event ID field 152 stores an entry with which a transition condition is associated. The next screen ID field 153 stores an identifier of a display screen of a transition destination. The action ID field 154 stores a transition identifier for use in giving notice of an occurrence of a transition to an application program, which is executed on the information processing device 30 to perform information processing designated by a user using a plurality of display screens.

The next domain field 155 stores an identifier of the transition diagram window 100 where the display screen of the transition destination is placed. The interrupt field 156 stores a flag indicating whether the transition is caused by an interrupt. The condition number field 157 stores the number of transition conditions. The condition 1 field 158 stores a value of a variable representing a first transition condition for an occurrence of the transition. The condition 2 field 159 stores a value of a variable representing a second transition condition for an occurrence of the transition. The condition 3 field 160 stores a value of a variable representing a third transition condition for an occurrence of the transition. The number of transition conditions is not limited to three.

According to the editing device 10, the transition rules are stored in the foregoing transition table for management, thereby facilitating the addition and editing of the transition rule.

FIG. 17 shows a display example of an editing work window provided to the user by the editing device 10. During editing, the editing device 10 displays, for example, an editing work window 200 containing a working window 210, a navigator window 220, a property window 230, and an outline window 240 on a display monitor.

The working window 210 includes a transition diagram window 100 and a button group frame 211. In the transition diagram window 100, there are placed a screen node 101, a link 102, a jump node 103, an interrupt node 104, and a function node 105. The editing device 10 displays the transition diagram window 100 to thereby visually provide the user with the transition structure of the display screens. The button group frame 211 shows buttons by which the user performs various specifications and operations such as, for example, a selection of a screen node 101 to be displayed, a generation of a link 102, a generation of a jump node 103, a generation of an interrupt node 104, a generation of a function node 105, and an input of a prerequisite. The editing device 10 displays the button group frame 211 to thereby accept these various specifications and operations from the user.

The navigator window 220 displays the names and stored areas of transition conditions (for example, events), display screens, transition diagram windows 100 and the like stored inside, for example, in a tree structure hierarchically. The editing device 10 displays the navigator window 220, thereby allowing the user to perform a switching operation of the transition diagram window 100 displayed on the working window 210. The property window 230 displays properties of a screen node 101 or link 102 selected by the user such as, for example, an ID of the link 102, an action ID, an event to be a transition condition or other conditions. The outline window 240 displays a reduced image of the currently displayed transition diagram window 100. The editing device 10 displays the foregoing editing work window 200 for the user, thereby being capable of providing the transition structure under editing and accepting various operating instruction inputs from the user.

FIG. 18 shows the configuration of the information processing device 30. The information processing device 30 includes an application program execution unit 301, a display unit 311, a memory unit 312, an acquisition unit 313, and a change unit 314. The application program execution unit 301 is a functional block for executing an application program. The display unit 311 displays a display screen corresponding to information processing performed by the application program out of a plurality of display screens.

The memory unit 312 stores a transition rule that defines a transition condition for performing a transition of a screen to be displayed on the display unit 311 from a display screen of the transition source to a display screen of the transition destination. The memory unit 312 stores, for example, the display screen of the transition source, the display screen of the transition destination, the transition condition, and a transition identifier for use in giving notice of an occurrence of the transition to the application program in association with each other. The memory unit 312 may store the transition table in FIG. 16, for example.

The acquisition unit 313 reads the currently displayed display screen and the transition condition based on a user's operation for the currently displayed display screen from the memory unit 312 to acquire the display screen of the transition destination. Alternatively, the acquisition unit 313 may read the transition condition based on the information processing performed by the application program from the memory unit 312 to acquire the display screen of the transition destination. Moreover, in the case of acquiring the display screen of the transition destination, the acquisition unit 313 may acquire the display screen of the transition destination, for example, on the basis of the transition condition that depends on the variable indicating the state of the information processing device 30 issued by the application program.

The change unit 314 changes the display screen displayed by the display unit 311 to the display screen of the transition destination acquired by the acquisition unit 313. Moreover, the change unit 314 may give notice of the identifier of the corresponding transition to the application program in response to the change from the display screen displayed by the display unit 311 to the display screen of the transition destination. The application program that has received the transition identifier is allowed to perform the information processing based on the transition.

The information processing device 30 operates, for example, as a display device by the execution of the installed display program. In this instance, the display program includes the display unit 311, the memory unit 312, the acquisition unit 313, and the change unit 314 to cause the information processing device to function as a display device which executes the application program.

FIG. 19 shows a flowchart of the processing of the information processing device 30. First, the acquisition unit 313 determines whether there has occurred an event described as the transition condition in the transition rule in which the transition source is the currently displayed display screen (S111). The acquisition unit 313 awaits the processing until the event occurs (S111: No). The acquisition unit 313 acquires a variable from the application program (S112) if the event occurs (S111: Yes). Subsequently, the acquisition unit 313 searches the transition rules in which the transition source is the currently displayed display screen for the transition condition based on the state of the information processing device 30 indicated by the acquired variable and the event that has occurred and acquires the appropriate transition rule from the memory unit 312 (S113).

Subsequently, the change unit 314 sends a transition identifier for use in giving notice of the occurrence of the transition (for example, an action ID), which is described in the acquired transition rule, to the application program (S114).

This allows the application program to perform predetermined information processing which should be performed along with the transition of the display screen.

Subsequently, the change unit 314 sends the ID of the next display screen described in the acquired transition rule and a pre-change notice indicating a state before the occurrence of the transition of the display screen to the application program (S115). This allows the application program to perform processing which should be performed before the transition of the display screen. Thereafter, the change unit 314 reads out image data on the next display screen described in the acquired transition rule and outputs the readout display screen onto a display panel (S116). This enables the information processing device 30 to display a new display image for the user.

Subsequently, the change unit 314 sends the ID of the next display screen described in the acquired transition rule and a post-change notice indicating a state after the occurrence of the transition of the display image to the application program (S117). This allows the application program to perform processing which should be performed after the transition of the display screen. Upon completion of the process of step S117, the acquisition unit 313 then returns the processing to step S111.

FIG. 20 shows an example of the description of the application program.

The application program may include an instruction to set a condition for displaying a display screen A, an instruction to set a condition for displaying a display screen B, and an instruction to set a condition for displaying a display screen C, as shown in an example of the description of line numbers 10, 20, and 30 in FIG. 20. This description of the instructions causes the application program to issue an event for effecting a display screen transition to the display program, which causes the information processing device 30 to function as a display device.

Moreover, the application program may include instructions for executing processing which should be performed for the display screen A, the display screen B, and the display screen C before the transition, as shown in an example of the description of line numbers 40 to 90 in FIG. 20. This description of the instructions causes the application program to perform specific information processing before the transition to the display screen, triggered by the notice sent from the display program.

The application program may include instructions for executing processing which should be performed for the display screen A, the display screen B, and the display screen C after the transition, as shown in an example of the description of line numbers 100 to 150 in FIG. 20. This description of the instructions causes the application program to perform specific information processing after the transition to the display screen, triggered by the post notice sent from the display program.

According to the foregoing information processing device 30, it is possible to separate the display program for controlling the transition of the display screen from the application program, thereby enabling a reduction in change of the application program accompanied by, for example, a change in transition of the display screen.

FIG. 21 shows an example of a hardware configuration of a computer 1900 according to the embodiment of the present invention. The computer 1900 according to this embodiment includes a CPU peripheral section having a CPU 2000, a RAM 2020, and a graphic controller 2075, which are mutually connected via a host controller 2082, an I/O section having a communication interface 2030, a hard disk drive 2040, and a CD-ROM drive 2060, which are connected to the host controller 2082 via an I/O controller 2084, and a legacy I/O section having a ROM 2010, a flexible disk drive 2050, and an I/O chip 2070, which are connected to the I/O controller 2084.

The host controller 2082 connects the RAM 2020 to the CPU 2000 and the graphic controller 2075 which access the RAM 2020 at high transfer rate. The CPU 2000 operates based on programs stored in the ROM 2010 and the RAM 2020 to control respective sections. The graphic controller 2075 acquires image data generated on a frame buffer provided in the RAM 2020 by the CPU 2000 and controls the display device 2080 to display the image data. Alternatively, the graphic controller 2075 may include inside the frame buffer for storing the image data generated by the CPU 2000.

The I/O controller 2084 connects the host controller 2082 to the communication interface 2030, the hard disk drive 2040, and the CD-ROM drive 2060, which are relatively high-speed I/O devices. The communication interface 2030 communicates with other devices via a network. The hard disk drive 2040 stores programs and data used by the CPU 2000 in the computer 1900. The CD-ROM drive 2060 reads a program or data from a CD-ROM 2095 and provides the RAM 2020 or the hard disk drive 2040 with the program or data.

The I/O controller 2084 is connected to the ROM 2010, the flexible disk drive 2050, and the I/O chip 2070, which are relatively low-speed I/O devices. The ROM 2010 stores a boot program executed by the computer 1900 on startup and programs that depend on the hardware of the computer 1900. The flexible disk drive 2050 reads a program or data from a flexible disk 2090 and provides the hard disk drive 2040 with the program or data via the RAM 2020. The I/O chip 2070 connects the flexible disk drive 2050 and various I/O devices, for example, via a parallel port, a serial port, a keyboard port, a mouse port and the like.

The program provided to the hard disk drive 2040 via the RAM 2020 is stored in a recording medium such as the flexible disk 2090, the CD-ROM 2095, or an IC card and is provided by a user. The program is read from the recording medium and installed in the hard disk drive 2040 in the computer 1900 via the RAM 2020 before it is executed on the CPU 2000.

The program installed in the computer 1900 to cause the computer 1900 to function as the editing device 10 includes a screen editor module, a screen definition data memory unit module, a transition editor module, a transition table memory unit module, an execution model editor module, an execution model code memory unit module, a code output unit module, and a test display device module. The program or modules work on the CPU 2000 or the like and causes the computer 1900 to function as the screen editor 11, the screen definition data memory unit 12, the transition editor 13, the transition table memory unit 14, the execution model editor 15, the execution model code memory unit 16, the code output unit 17, and the test information processing device 20, respectively.

Moreover, the display program, which is installed in the computer 1900 to cause the computer 1900 to function as the information processing device 30, includes a display unit, a memory unit, an acquisition unit, and a change unit. The program or modules work on the CPU 2000 or the like and causes the computer 1900 to function as the display unit 311, the memory unit 312, the acquisition unit 313, and the change unit 314, respectively.

The above programs or modules may also be stored in an external storage medium. The storage medium that is usable is an optical recording medium such as a DVD or a CD, a magnet-optical recording medium such as an MO, a tape medium, or a semiconductor memory such as an IC card, as well as the flexible disk 2090 and the CD-ROM 2095. In addition, it is possible to use a storage device, as a recording medium, such as a hard disk or a RAM provided in a server system connected to a private communication network or the Internet in order to provide the computer 1900 with the programs via the network. Also in the case of delivering a transition rule that is a product of development service performed by the method of the present invention, it is possible to deliver the product stored in a recording medium by hand or to transfer the product via a private communication network.

While the present invention has been described hereinabove in conjunction with the preferred embodiments, it is to be understood that the technical scope of the present invention is not limited to the above described embodiments. It is apparent to those skilled in the art that various modifications or improvements may be made to the foregoing. It is apparent from the appended claims that the technical scope of the present invention may include the embodiments in which such modifications or improvements have been made.

BRIEF DESCRIPTION OF THE DRAWINGS

FIG. 16 shows an example of a transition table.

FIG. 20 is a diagram illustrating an example of description of an application program.

DESCRIPTION OF SYMBOLS

Figure 1:
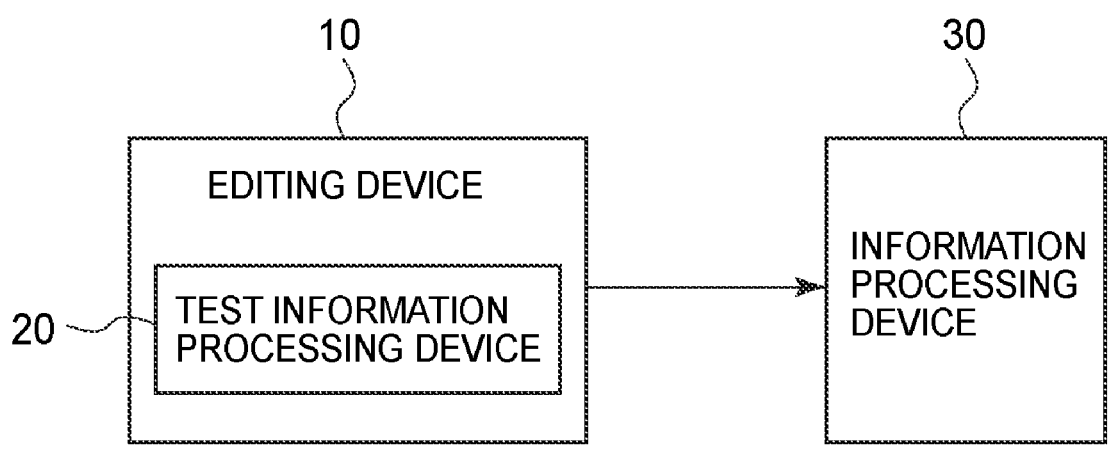
FIG. 1 is a diagram illustrating an editing device 10 and an information processing device 30 according to the embodiment.
Figure 2:
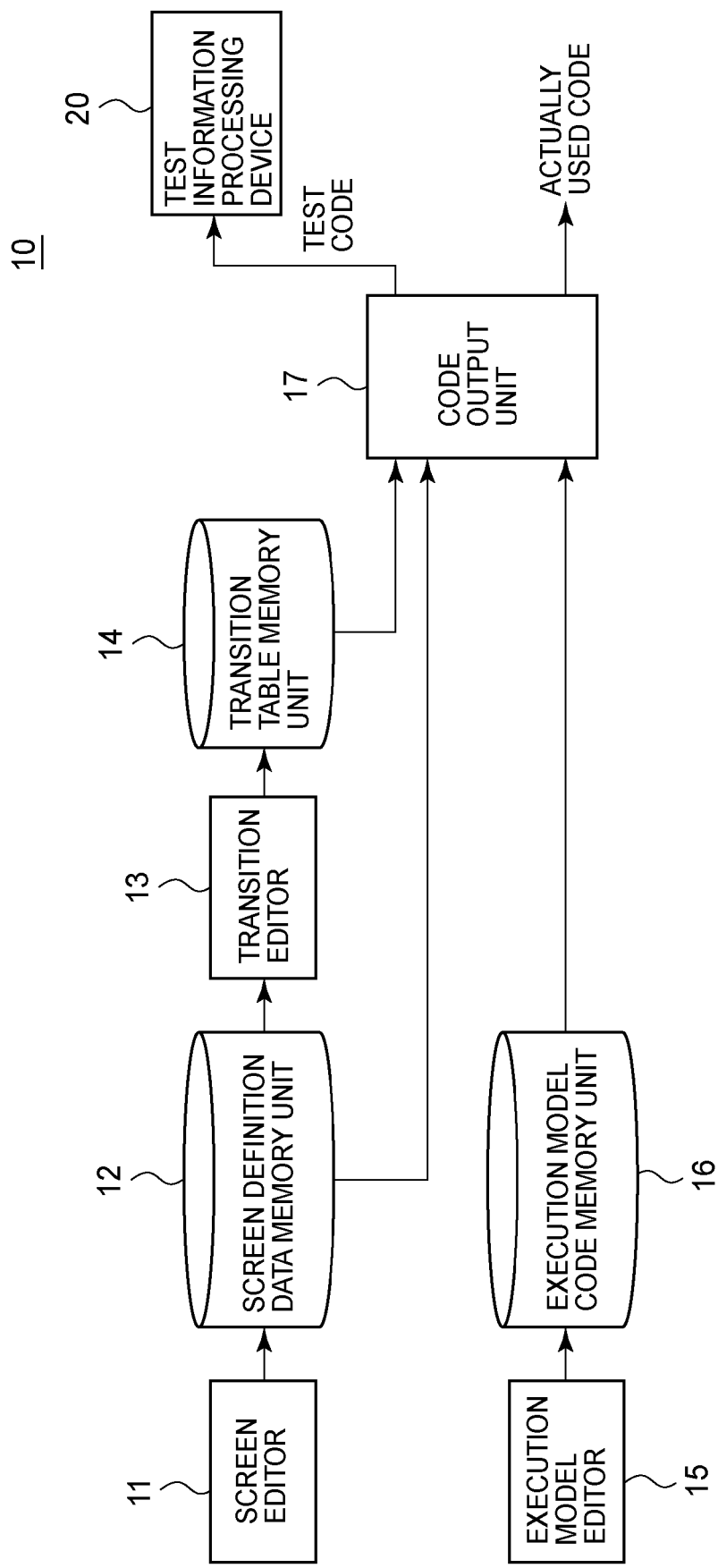
FIG. 2 is a diagram illustrating a configuration of the editing device 10.
Figure 3:
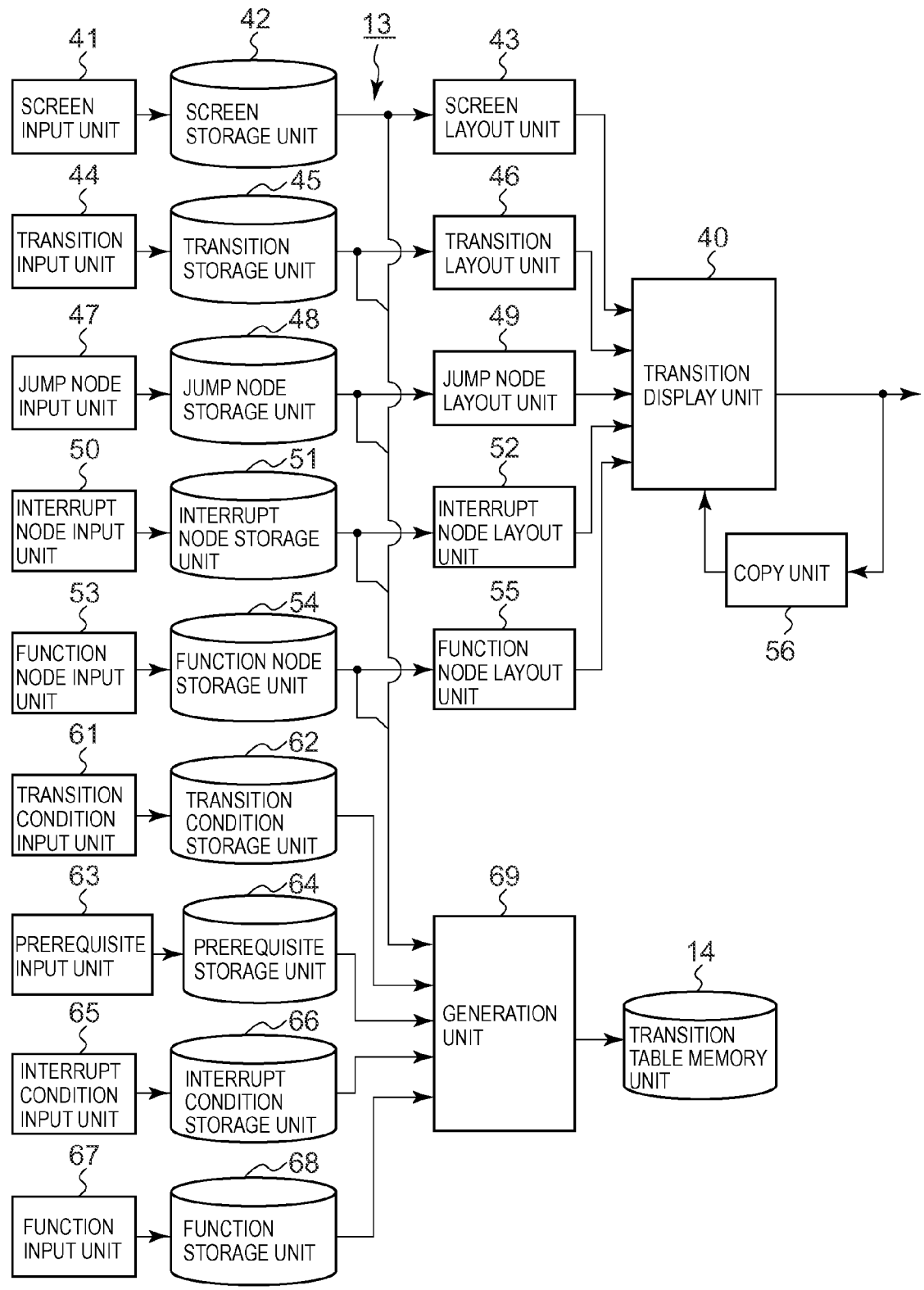
FIG. 3 is a diagram illustrating a configuration of a transition editor 13 along with a transition table memory unit 14.
Figure 4:
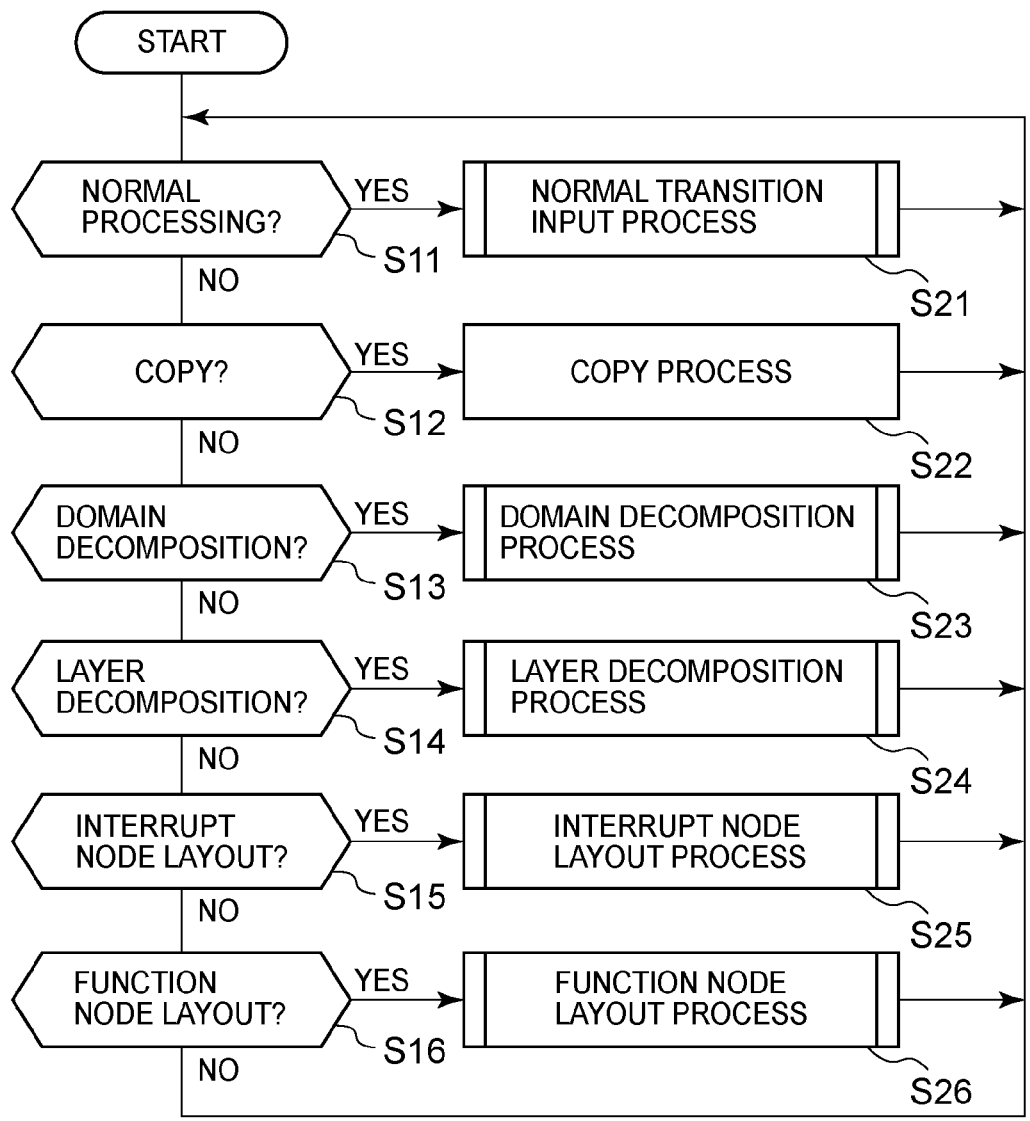
FIG. 4 is a flowchart of processing of the transition editor 13 included in the editing device 10.
Figure 5:
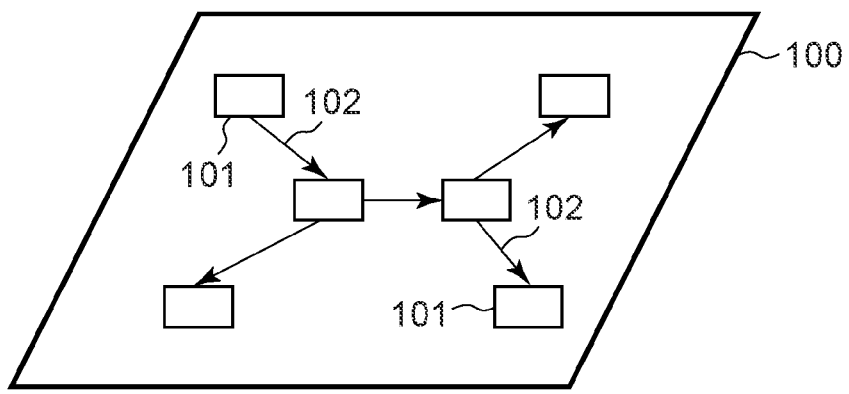
FIG. 5 is a diagram illustrating a transition diagram window 100 as an example for describing a normal transition input process in step S21 of FIG. 4.
Figure 6:
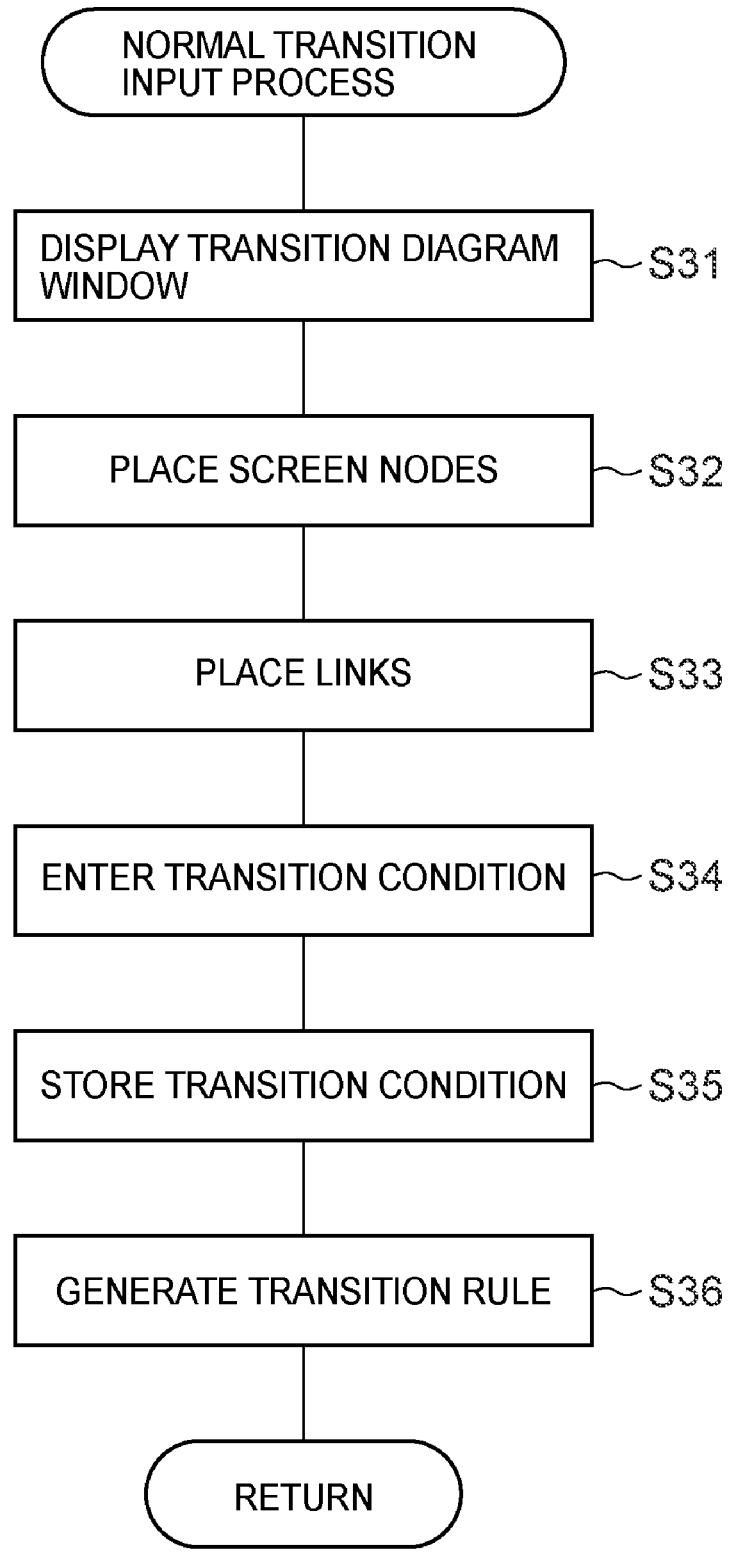
FIG. 6 is a flowchart of a procedure for a normal transition input process in step S21 of FIG. 4.
Figure 7:
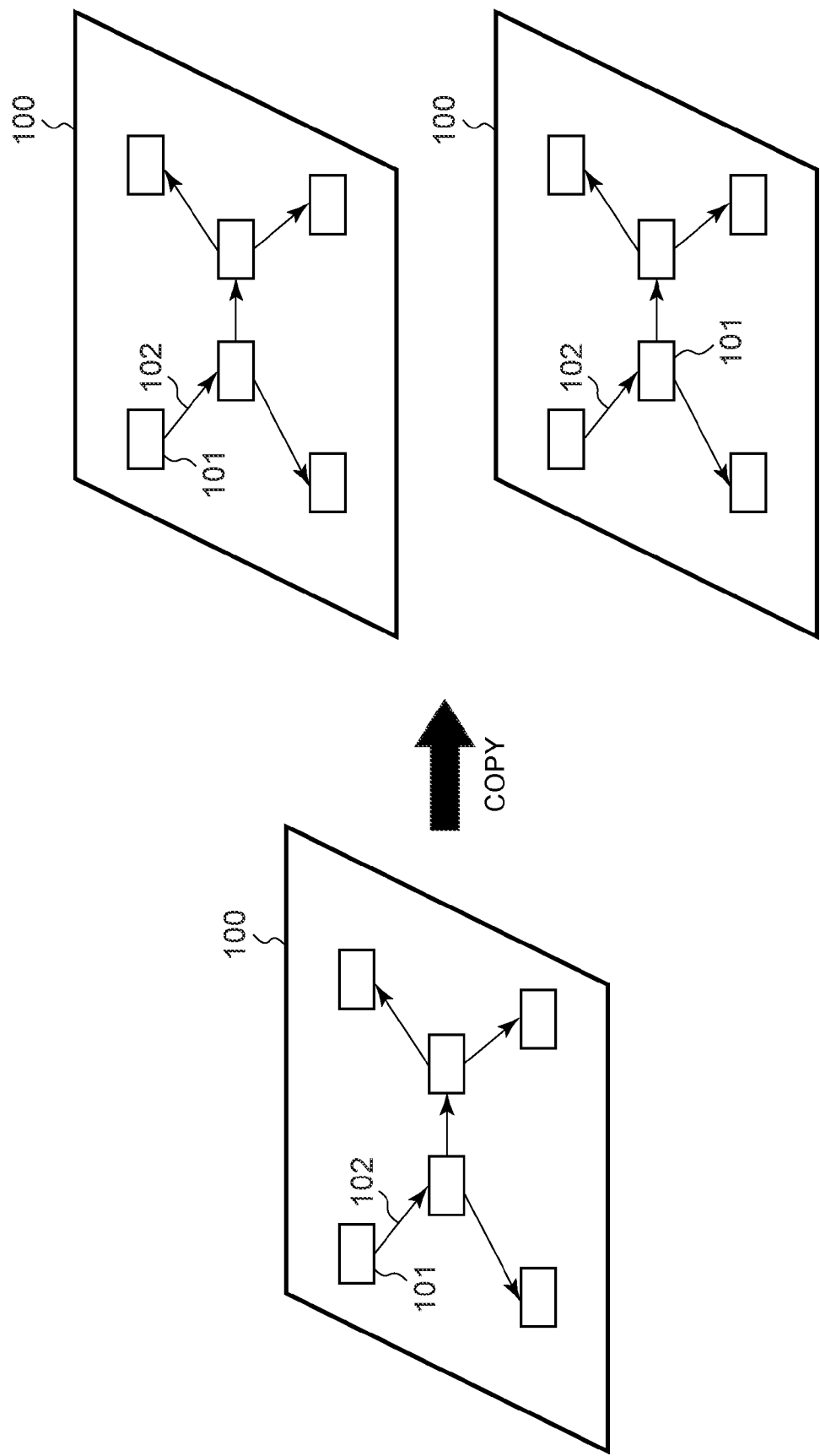
FIG. 7 is a diagram illustrating a transition diagram window 100 as an example for describing a copy process in step S22 of FIG. 4.
Figure 8:
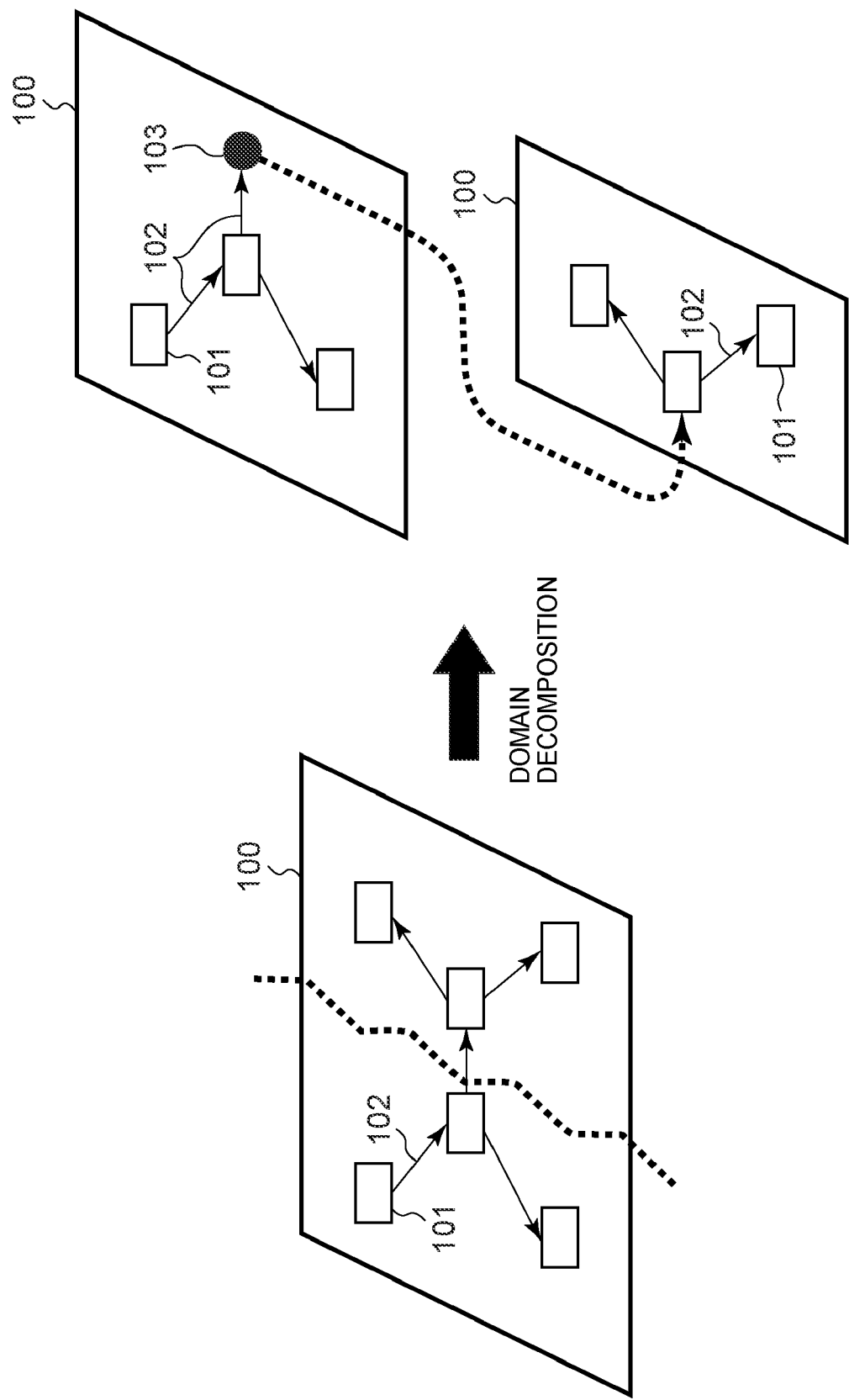
FIG. 8 is a diagram illustrating a transition diagram window 100 as an example for describing a domain decomposition process in step S23 of FIG. 4.
Figure 9:
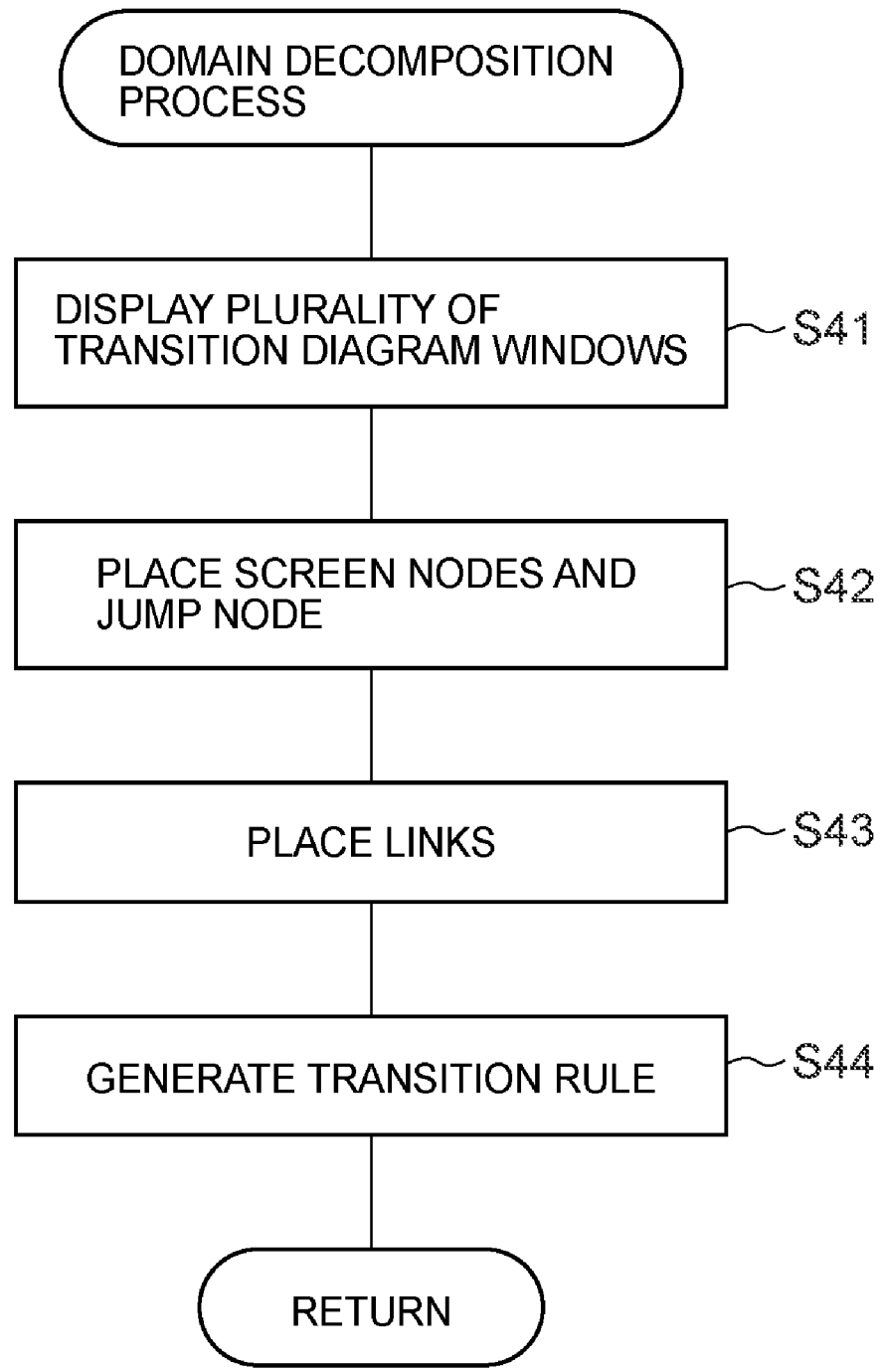
FIG. 9 is a flowchart of a procedure for the domain decomposition process in step S23 of FIG. 4.
Figure 10:
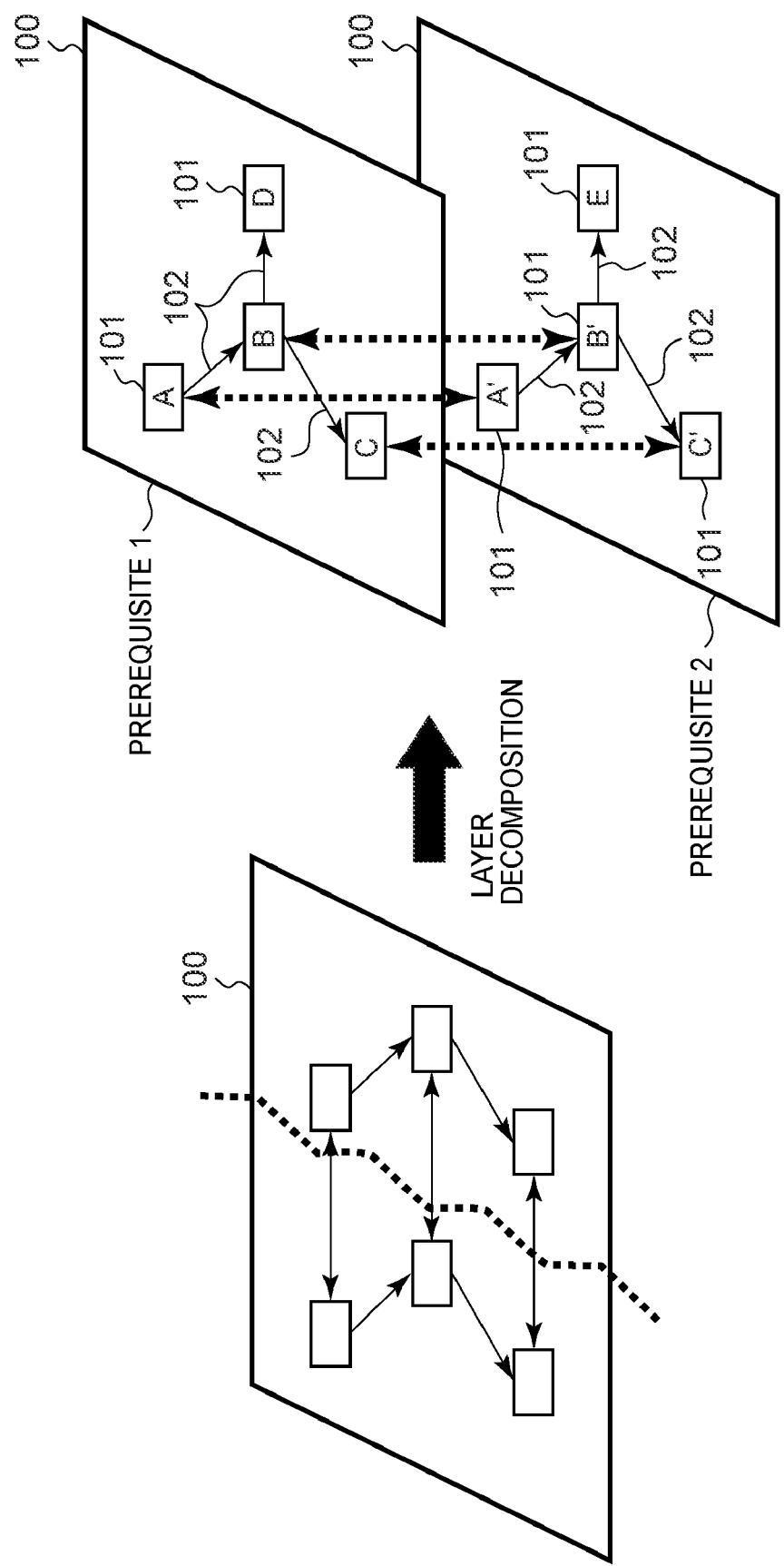
FIG. 10 is a diagram illustrating a transition diagram window 100 as an example for describing a layer decomposition process in step S24 of FIG. 4.
Figure 11:
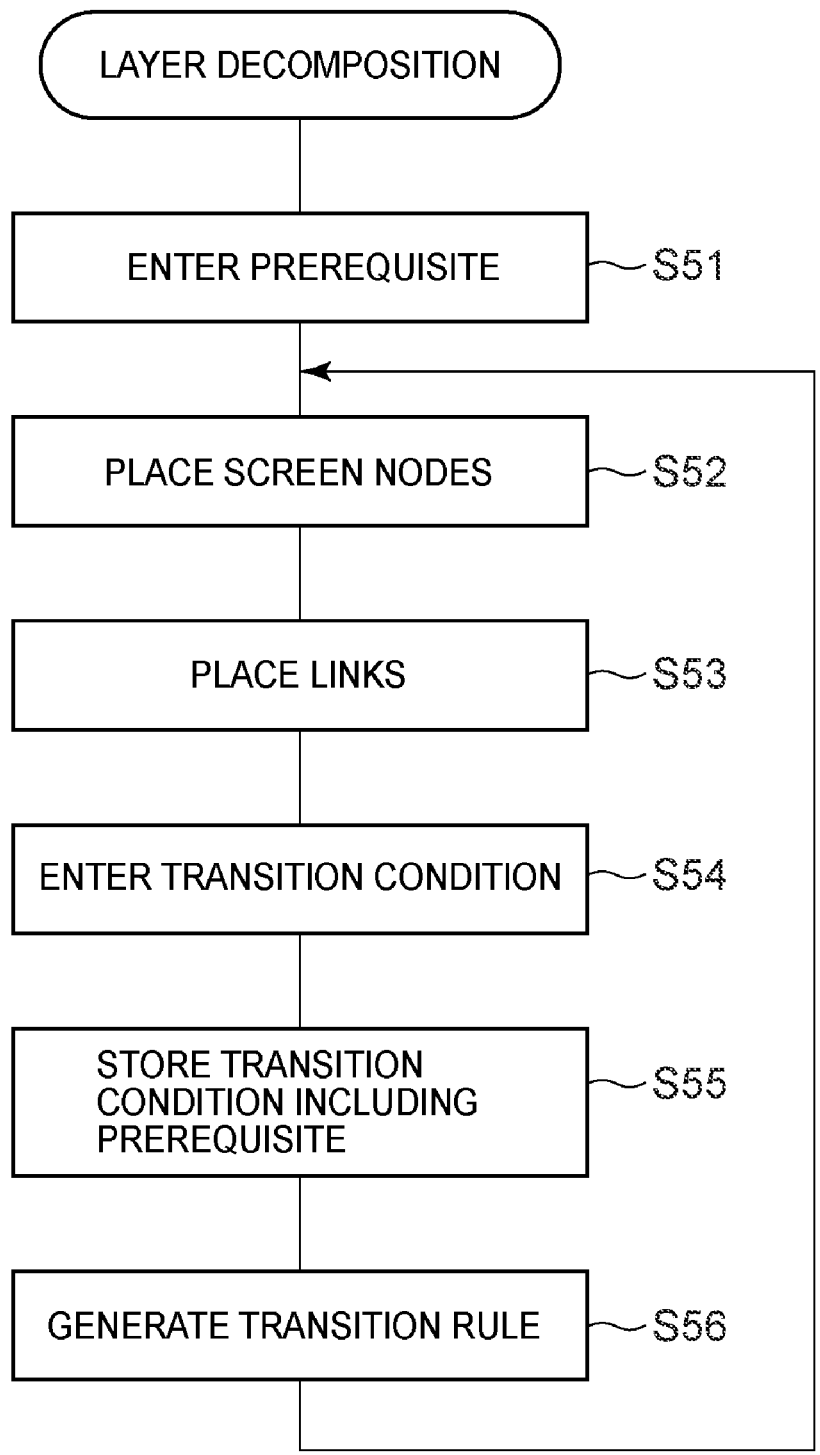
FIG. 11 is a flowchart of a procedure for a layer decomposition process in step S24 of FIG. 4.
Figure 12:
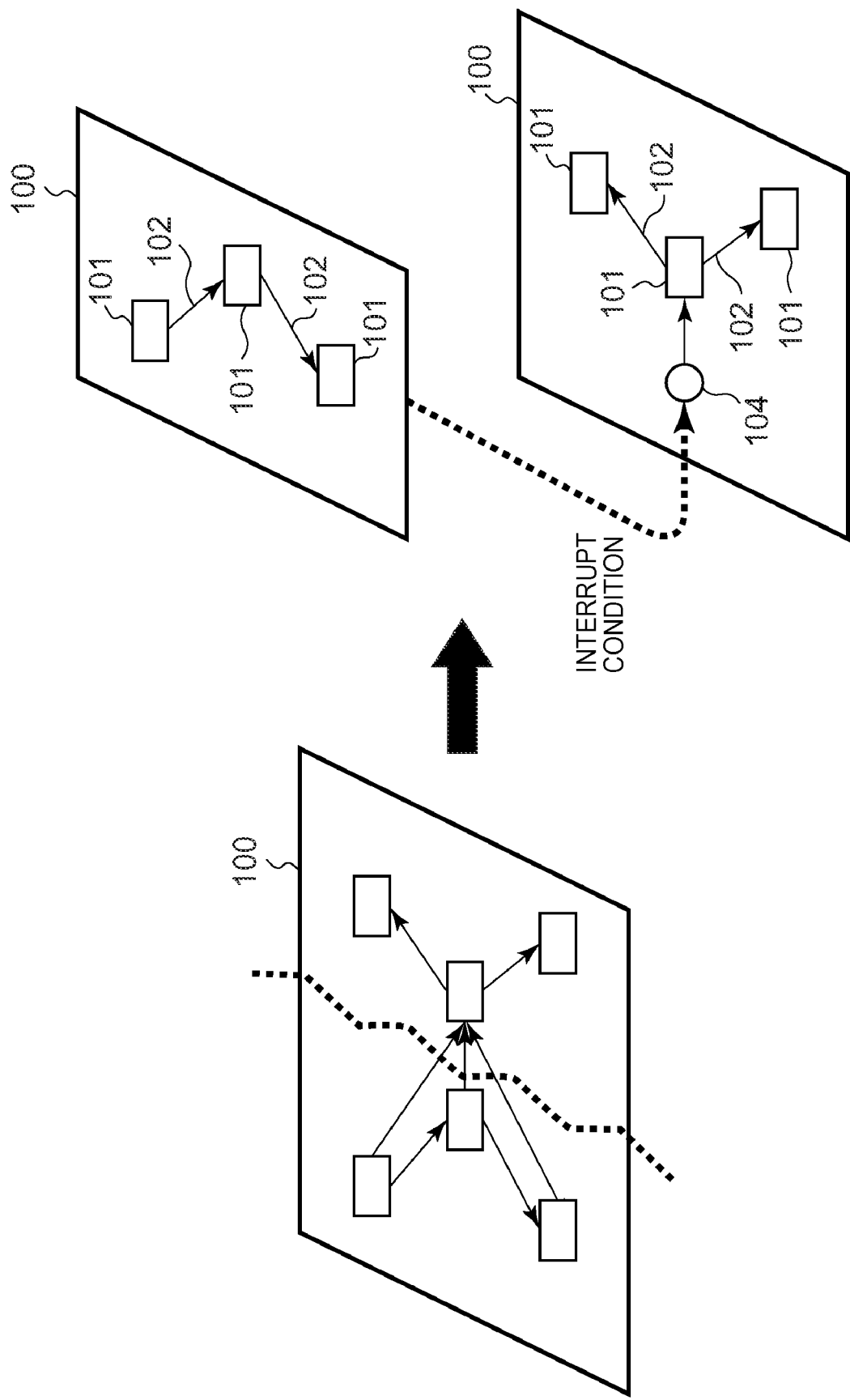
FIG. 12 is a diagram illustrating a transition diagram window 100 as an example for describing an interrupt node layout process in step S25 of FIG. 4.
Figure 13:
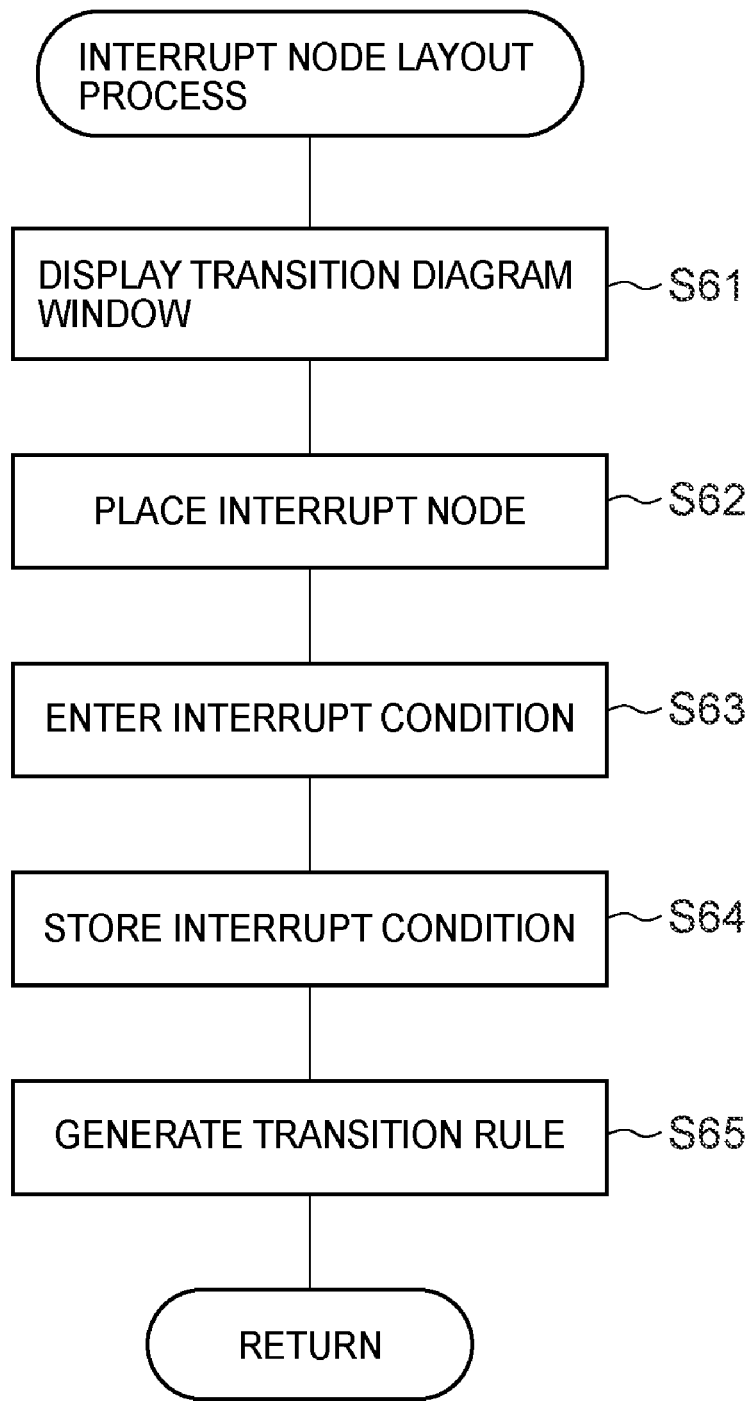
FIG. 13 is a flowchart of a procedure for the interrupt node layout process in step S25 of FIG. 4.
Figure 14:
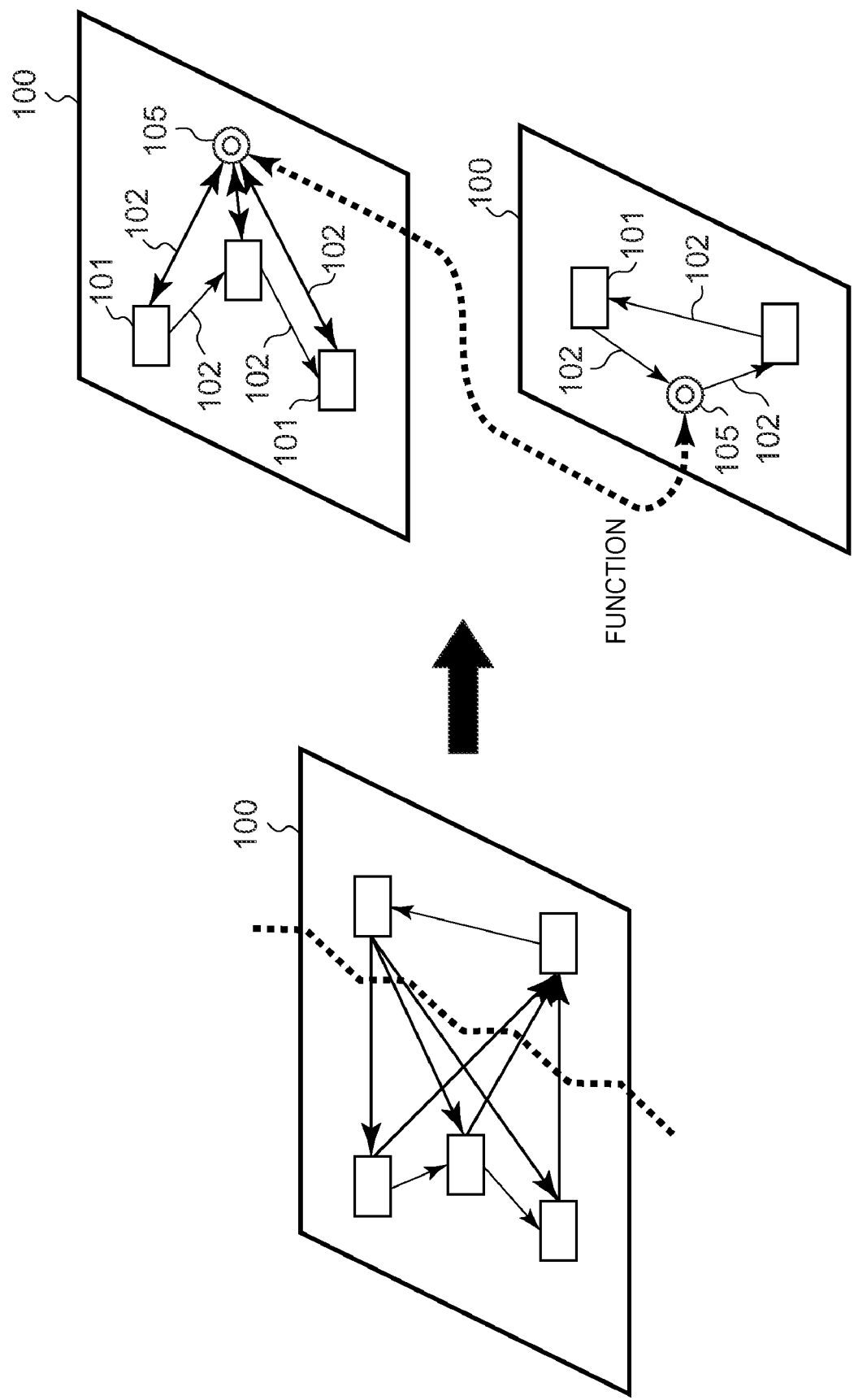
FIG. 14 is a diagram illustrating a transition diagram window 100 as an example for describing a function node layout process in step S26 of FIG. 4.
Figure 15:
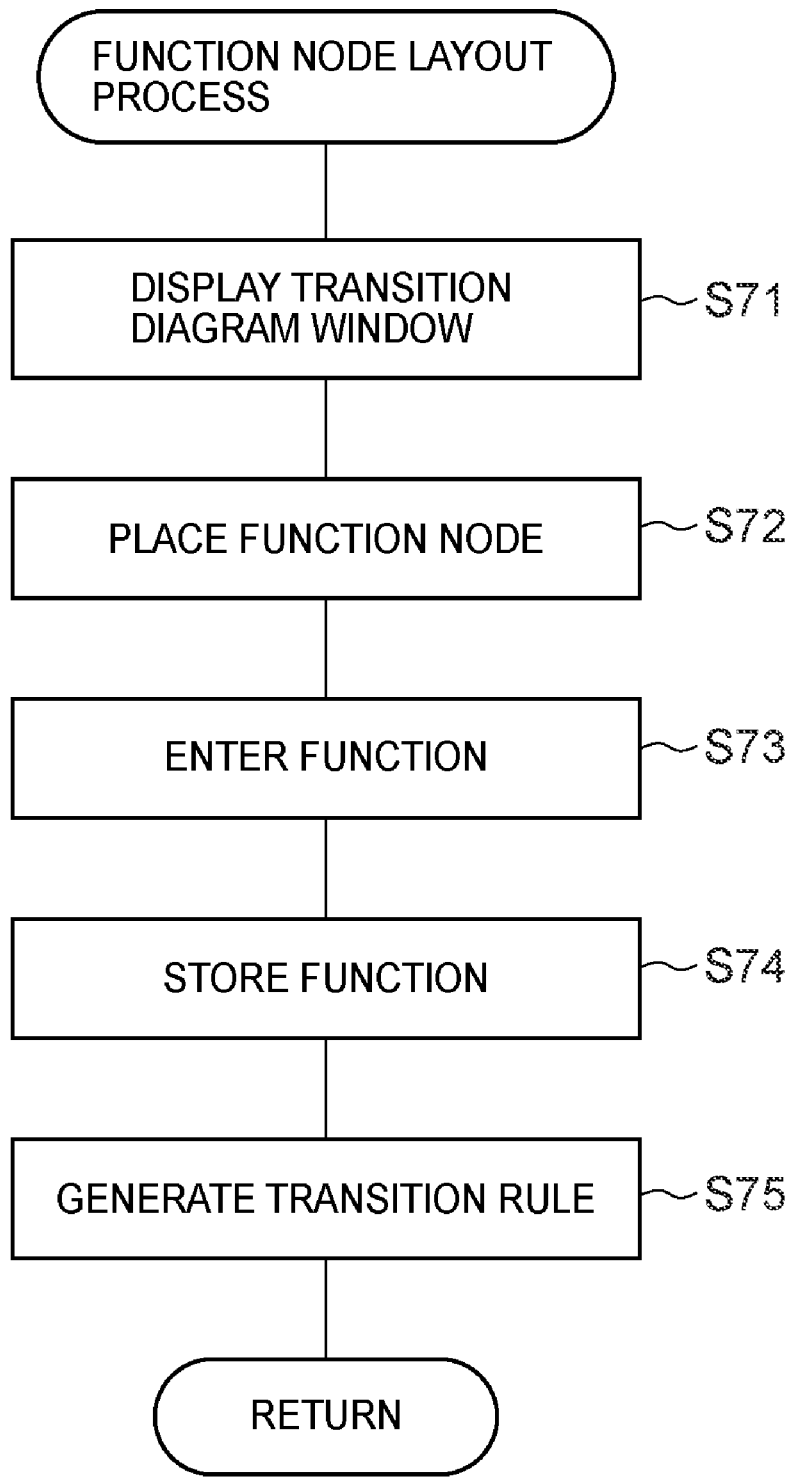
FIG. 15 is a flowchart of a procedure for the function node layout process in step S26 of FIG. 4.
Figure 17:
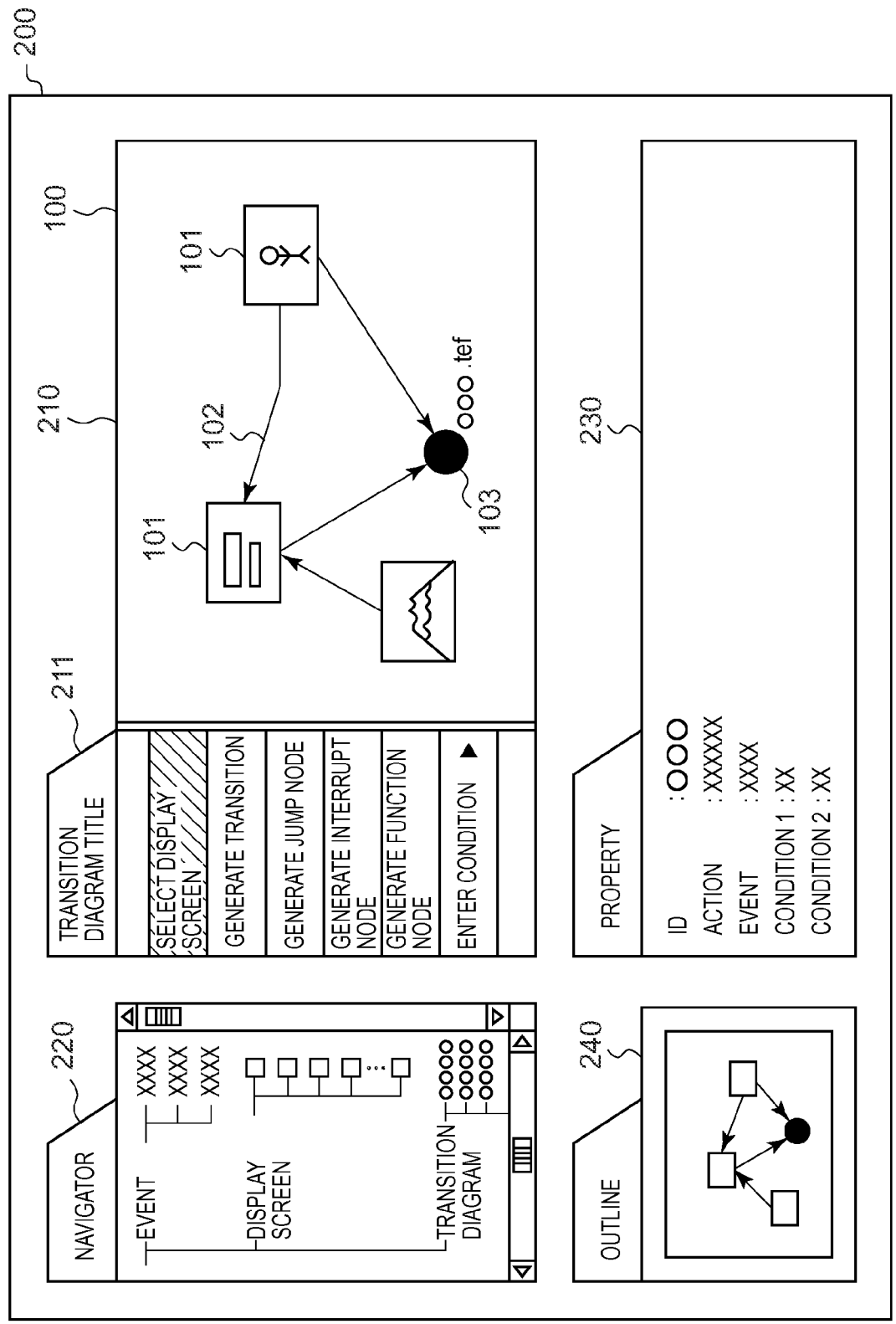
FIG. 17 is a diagram illustrating a display example of an editing work window presented by the editing device 10 to a user.
Figure 18:
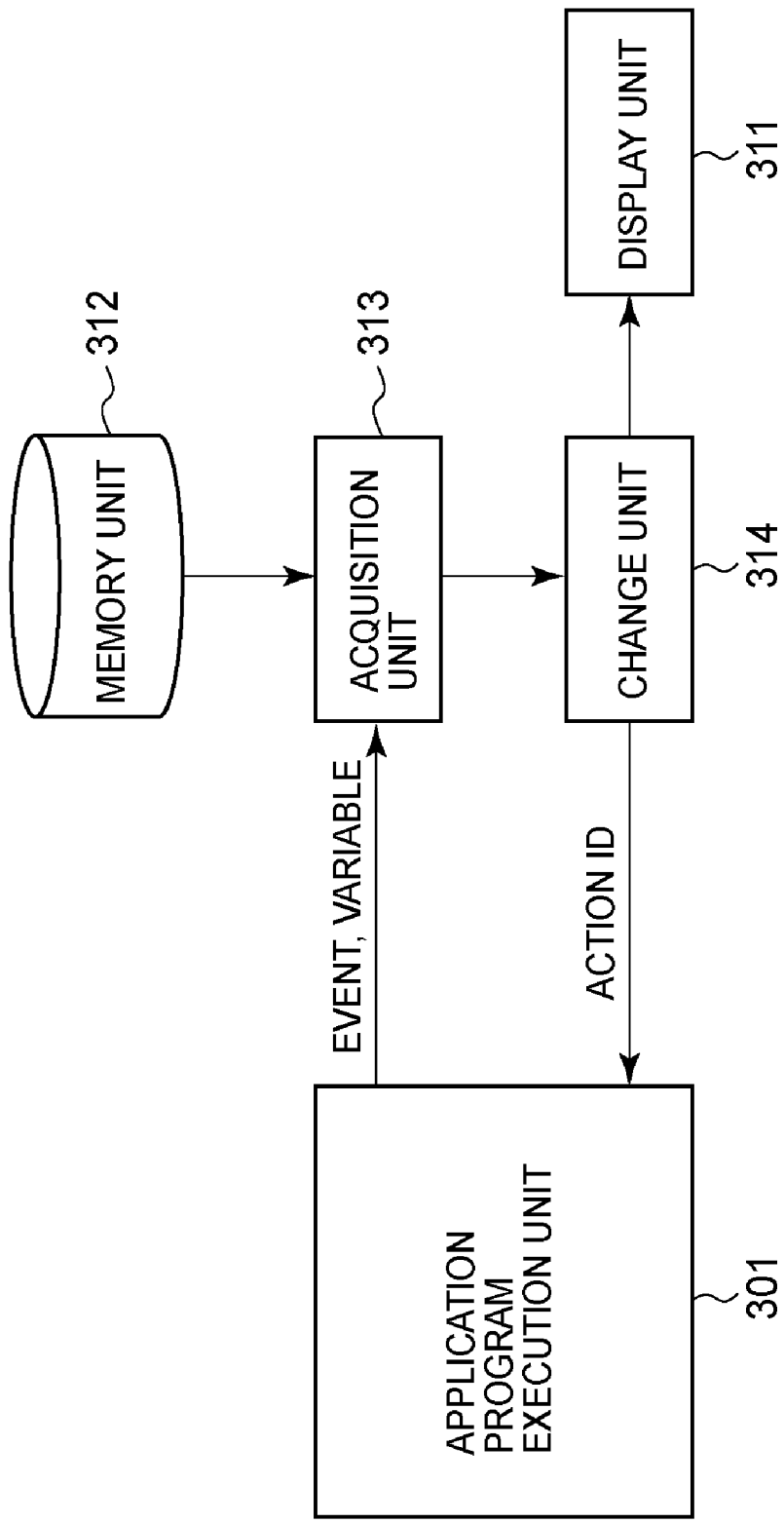
FIG. 18 is a diagram illustrating a configuration of the information processing device 30.
Figure 19:
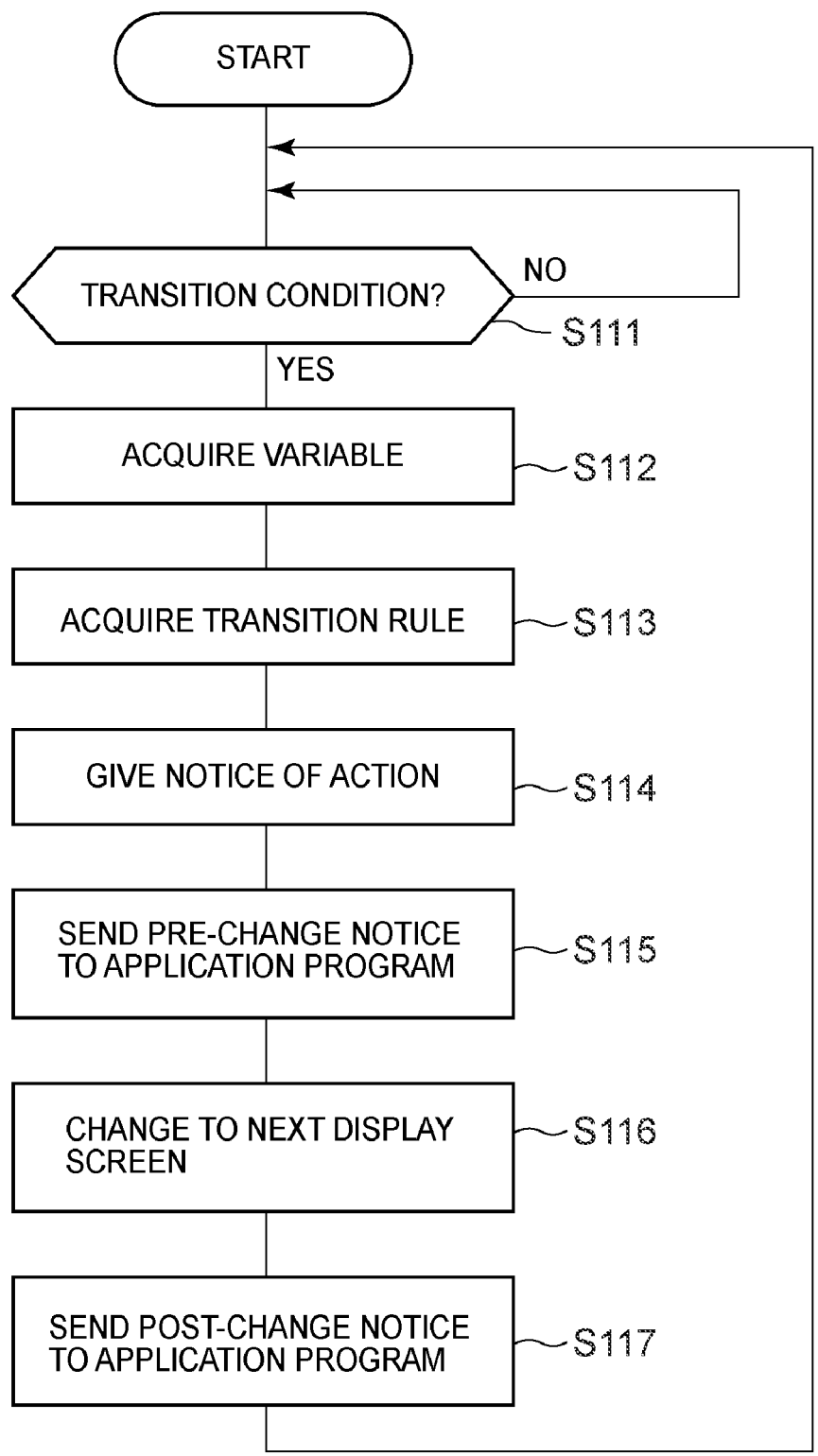
FIG. 19 is a flowchart illustrating the processing of the information processing device 30.
Figure 21:
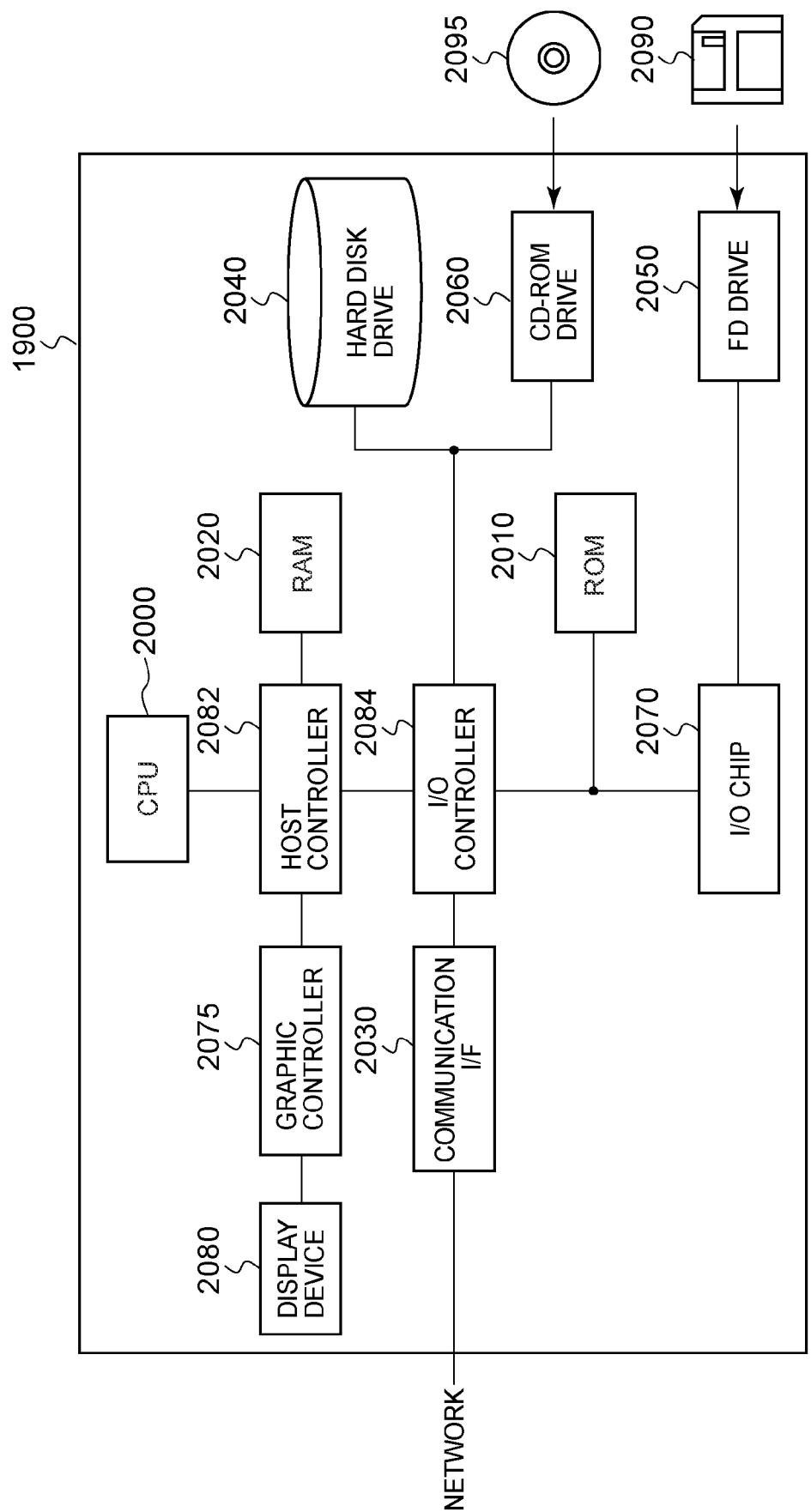
FIG. 21 is a diagram illustrating an example of a hardware configuration of a computer 1900 according to the embodiment of the present invention.

10 Editing device
20 Test information processing device
30 Information processing device
11 Screen editor
12 Screen definition data memory unit
13 Transition editor
14 Transition table memory unit
15 Execution model editor
16 Execution model code memory unit
17 Code output unit
40 Transition display unit
41 Screen input unit
42 Screen storage unit
43 Screen layout unit
44 Transition input unit
45 Transition storage unit
46 Transition layout unit
47 Jump node input unit
48 Jump node storage unit
49 Jump node layout unit
50 Interrupt node input unit
51 Interrupt node storage unit
52 Interrupt node layout unit
53 Function node input unit
54 Function node storage unit
55 Function node layout unit
56 Copy unit
61 Transition condition input unit
62 Transition condition storage unit
63 Prerequisite input unit
64 Prerequisite storage unit
65 Interrupt condition input unit
66 Interrupt condition storage unit
67 Function input unit
68 Function storage unit
69 Generation unit
100 Transition diagram window
101 Screen node
102 Link
103 Jump node
104 Interrupt node
105 Function node
151 Current screen ID field
152 Event ID field
153 Next screen ID field
154 Action ID field
155 Next domain field
156 Interrupt field
157 Condition number field
158 Condition 1 field
159 Condition 2 field
160 Condition 3 field
200 Editing work window
210 Working window
211 Button group frame 220 Navigator window
230 Property window
240 Outline window
301 Application program execution unit
311 Display unit
312 Memory unit
313 Acquisition unit
314 Change unit
1900 Computer
2000 CPU
2010 ROM
2020 RAM
2030 Communication interface
2040 Hard disk drive
2050 Flexible disk drive
2060 CD-ROM drive
2070 I/O chip
2075 Graphic controller
2080 Display device
2082 Host controller
2084 I/O controller
2090 Flexible disk
2095 CD-ROM

The invention claimed is:

1. An editing device for editing transitions each between a plurality of display screens, comprising:
 a transition display unit which displays a transition diagram window for allowing a user to enter the transition between the plurality of display screens;
 a screen layout unit which places screen nodes representing the display screens specified by the user in the transition diagram window;
 a transition layout unit which places a transition from the display screen before the transition to the display screen after the transition specified by the user into the transition diagram window as a link from the screen node representing the display screen before the transition to the screen node representing the display screen after the transition;
 a transition condition input unit which allows the user to enter a transition condition for performing the transition represented by the link;
 a transition condition storage unit which stores the transition condition for performing the transition represented by the link, associating the transition condition with the link; and
 a generation unit which generates a transition rule for performing the transition between the plurality of display screens on the basis of the link and the transition condition stored in the transition condition storage unit, wherein:
 the transition display unit displays a plurality of the transition diagram windows;
 the screen layout unit places the plurality of screen nodes in the plurality of transition diagram windows according to a user's instruction;
 the transition layout unit places the link whose transition source or transition destination is the screen node in each of the transition diagram windows according to a user's instruction; and
 the generation unit generates the transition rule on the basis of a plurality of the links and the transition condition of each of the plurality of links which are placed in the plurality of transition diagram windows, the transition rule including a transition rule for a transition from at least one of the display screens in a first transition diagram window to at least one of the display screens in a second transition diagram window.

2. The editing device according to claim 1, further comprising a copy unit which generates the transition diagram window of the copy destination and places the same screen node as the screen node of the copy source into the transition diagram window of the copy destination in response to a user's input of the instruction for producing a copy of the transition diagram window.

3. The editing device according to claim 1, further comprising a jump node input unit which places a jump node, which represents a transition from the display screen in the transition diagram window to the display screen in another transition diagram window, into at least one of the transition diagram windows according to a user's instruction.

4. The editing device according to claim 3, wherein the transition condition storage unit stores the transition condition including a transition condition entered with respect to a link connected to the jump node.

5. The editing device according to claim 1, further comprising a prerequisite input unit which accepts a user's input of a prerequisite for a transition included in the transition diagram window, associating the prerequisite with each of the plurality of transition diagram windows,
 wherein the transition condition storage unit stores the transition condition including the prerequisite associated with the transition diagram window where the link is placed, associating the transition condition with each of the links entered by the user.

6. The editing device according to claim 1, further comprising an interrupt node layout unit which places an interrupt node connected to a screen node, which represents an interrupt display screen of a transition destination, into the transition diagram window where the screen node of the transition destination is placed according to a user's instruction in response to an occurrence of an interrupt during display of the plurality of display screens.

7. The editing device according to claim 6, further comprising an interrupt condition input unit which recognizes an interrupt condition by a user's input of a specification of the display screen of an interrupt source, from which the transition caused by an interrupt represented by the interrupt node should be performed,
 wherein the generation unit generates the transition rule covering a transition for displaying the display screen of the interrupt destination in response to an occurrence of the interrupt during display of the display screen satisfying the interrupt condition.

8. The editing device according to claim 1, further comprising a function node input unit which places function nodes according to a user's instruction into each of the transition diagram windows each of which contains a layout of the screen nodes before the transition and the screen nodes after the transition corresponding to the display screens whose transition relation is defined by a function, in the case where the function defines the transition relation between one or more display screens before the transition and one or more display screens after the transition.

9. The editing device according to claim 8, further comprising a function input unit which allows a user to enter a function defined by the function node,
 wherein the generation unit generates the transition rule covering a transition satisfying a function associated with the function node.

10. The editing device according to claim 1, wherein the generation unit generates, as the transition rule, a transition table which stores identifiers of the display screens of transition sources and transition destinations, entries associated with the transition conditions, and transition identifiers for use in giving notice of an occurrence of a transition to an application program product, which is executed on the information processing device having a display device to perform information processing specified by the user using the plurality of display screens, with respect to each of the plurality of transitions, in association with each other.

11. The editing device according to claim 1, further comprising:
    a screen editor which generates the display screen according to a user's instruction; and
    an execution model editor which defines a variable exchanged between the application program product, which is executed on the information processing device to perform information processing specified by the user using the plurality of display screens, and a display program product which displays the display screens.

12. The editing device according to claim 1, further comprising an information processing device having a test display device for use in allowing the user to test the transition between the plurality of display screens.

13. The editing device according to claim 12, further comprising a code output unit which outputs a test code, which includes the display program product to be executed on the test information processing device and the transition rule, and an actually used code, which is used in actual use and includes the display program product which should be executed on the information processing device having the display device and the transition rule.

14. An editing method for editing transitions each between a plurality of display screens using a computer, comprising:
    a transition display step of displaying a transition diagram window for allowing a user to enter the transition between the plurality of display screens;
    a screen layout step of placing screen nodes representing the display screens specified by the user in the transition diagram window using the computer;
    a transition layout step of placing a transition from the display screen before the transition specified by the user to the display screen after the transition into the transition diagram window as a link from the screen node representing the display screen before the transition to the screen node representing the display screen after the transition using the computer;
    a transition condition input step of allowing the user to enter a transition condition for performing the transition represented by the link using the computer;
    a transition condition storing step of storing the transition condition for performing the transition represented by the link using the computer, associating the transition condition with the link; and
    a generation step of generating a transition rule for performing the transition between the plurality of display screens using the computer on the basis of the link and the transition condition stored in the transition condition storing step, wherein:
    the transition display step displays a plurality of the transition diagram windows;
    the screen layout step places the plurality of screen nodes in the plurality of transition diagram windows according to a user's instruction;
    the transition layout step places the link whose transition source or transition destination is the screen node in each of the transition diagram windows according to a user's instruction; and
    the generation step generates the transition rule on the basis of a plurality of the links and the transition condition of each of the plurality of links which are placed in the plurality of transition diagram windows, the transition rule including a transition rule for a transition from at least one of the display screens in a first transition diagram window to at least one of the display screens in a second transition diagram window.

15. An editing program product for an editing device which edits transitions each between a plurality of display screens, the editing program product causing the editing device to function as:
    a transition display unit which displays a transition diagram window for allowing a user to enter the transition between the plurality of display screens;
    a screen layout unit which places screen nodes representing the display screens specified by the user in the transition diagram window;
    a transition layout unit which places a transition from the display screen before the transition to the display screen after the transition specified by the user into the transition diagram window as a link from the screen node representing the display screen before the transition to the screen node representing the display screen after the transition;
    a transition condition input unit which allows the user to enter a transition condition for performing the transition represented by the link;
    a transition condition storage unit which stores the transition condition for performing the transition represented by the link, associating the transition condition with the link; and
    a generation unit which generates a transition rule for performing the transition between the plurality of display screens on the basis of the link and the transition condition stored in the transition condition storage unit, wherein:
    the transition display unit displays a plurality of the transition diagram windows;
    the screen layout unit places the plurality of screen nodes in the plurality of transition diagram windows according to a user's instruction;
    the transition layout unit places the link whose transition source or transition destination is the screen node in each of the transition diagram windows according to a user's instruction; and
    the generation unit generates the transition rule on the basis of a plurality of the links and the transition condition of each of the plurality of links which are placed in the plurality of transition diagram windows, the transition rule including a transition rule for a transition from at least one of the display screens in a first transition diagram window to at least one of the display screens in a second transition diagram window.

* * * * *